United States Patent
Yoo et al.

(10) Patent No.: US 9,612,729 B2
(45) Date of Patent: Apr. 4, 2017

(54) IMAGE PROCESSING APPARATUS AND CONTROLLING METHOD OF THE SAME

(71) Applicant: SAMSUNG ELECTRONICS CO., LTD., Suwon-si (KR)

(72) Inventors: Ho-june Yoo, Seoul (KR); Byung-seok Soh, Yongin-si (KR); Eun-seok Choi, Anyang-si (KR); Sang-on Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 461 days.

(21) Appl. No.: 14/100,816

(22) Filed: Dec. 9, 2013

(65) Prior Publication Data

US 2014/0101585 A1    Apr. 10, 2014

Related U.S. Application Data

(62) Division of application No. 12/855,726, filed on Aug. 13, 2010, now Pat. No. 8,661,365.

(30) Foreign Application Priority Data

Sep. 4, 2009   (KR) ..................... 10-2009-0083338
Feb. 12, 2010   (KR) ..................... 10-2010-0013520

(51) Int. Cl.
G06F 3/048   (2013.01)
G06F 3/0484   (2013.01)
(Continued)

(52) U.S. Cl.
CPC ...... *G06F 3/04842* (2013.01); *G06F 3/04845* (2013.01); *H04N 5/44591* (2013.01);
(Continued)

(58) Field of Classification Search
CPC ............ G06F 3/04842; G06F 3/04845; H04N 5/44591; H04N 5/45
(Continued)

(56) References Cited

U.S. PATENT DOCUMENTS 5,091,866 A   2/1992   Takagi
5,554,980 A   9/1996   Hashimoto et al.
(Continued)

FOREIGN PATENT DOCUMENTS

GB   2411559 A   8/2005
JP   2557359 B2   11/1996
JP   10-207682 A   8/1998

OTHER PUBLICATIONS

Communication dated Jan. 5, 2016, issued by the Korean Intellectual Property Office in corresponding Korean Application No. 10-2010-0013520.
(Continued)

*Primary Examiner* — David Phantana Angkool
(74) *Attorney, Agent, or Firm* — Sughrue Mion, PLLC

(57) ABSTRACT

An image processing apparatus and a controlling method of the same are provided. The method includes displaying a first screen corresponding to a first application; displaying a second screen corresponding to a second application above the first screen such that the second screen overlaps at least a portion of the first screen; and displaying at least a portion of the second screen that overlaps the portion of the first screen, while controlling the first application.

23 Claims, 22 Drawing Sheets

(51) Int. Cl.
*H04N 5/445* (2011.01)
*H04N 5/45* (2011.01)
*H04N 21/422* (2011.01)
*H04N 21/431* (2011.01)
*H04N 21/443* (2011.01)

(52) U.S. Cl.
CPC ......... *H04N 5/45* (2013.01); *H04N 21/42204* (2013.01); *H04N 21/4312* (2013.01); *H04N 21/4316* (2013.01); *H04N 21/4438* (2013.01)

(58) Field of Classification Search
USPC ........................................................ 715/790
See application file for complete search history.

(56) References Cited

U.S. PATENT DOCUMENTS

| | | | |
|---|---|---|---|
| 5,657,049 A * | 8/1997 | Ludolph | G06F 3/0481 345/419 |
| 5,694,150 A * | 12/1997 | Sigona | G06F 3/038 715/856 |
| 6,215,491 B1 | 4/2001 | Gould | |
| 6,219,027 B1 | 4/2001 | Shimizu et al. | |
| 6,259,432 B1 | 7/2001 | Yamada et al. | |
| 6,377,243 B1 | 4/2002 | Tomoda et al. | |
| 6,469,717 B1 * | 10/2002 | Wineke | G06F 3/04845 715/765 |
| 7,239,301 B2 | 7/2007 | Liberty et al. | |
| 7,434,177 B1 * | 10/2008 | Ording | G06F 3/04842 345/157 |
| 7,908,570 B2 * | 3/2011 | Schluetter | G06F 3/04812 715/772 |
| 8,161,414 B2 | 4/2012 | Schluetter et al. | |
| 2003/0007017 A1 * | 1/2003 | Laffey | G06F 3/04842 715/862 |
| 2005/0283616 A1 | 12/2005 | Lai | |
| 2007/0094618 A1 | 4/2007 | Yoshida | |
| 2012/0262370 A1 | 10/2012 | Ko et al. | |
| 2014/0143671 A1 * | 5/2014 | Kovalick | G06F 3/14 715/723 |
| 2015/0049089 A1 * | 2/2015 | Mitsui | G06T 11/206 345/440 |

OTHER PUBLICATIONS

Communication dated Sep. 28, 2012 issued by the European Patent Office in counterpart European Patent Application No. 10172368.2.
Communication, dated Sep. 17, issued by the European Patent Office in counterpart European Application No. 10 172 368.2.
Gorokhovsky, Vadim and Lou Amadio, "Layered Windows," Microsoft, Jan. 1, 2000, Retrieved from the Internet: http://msdn.microsoft.com/en-us/library/ms997507.aspx#layerwin_topic2 [retrieved on Sep. 6, 2013].

* cited by examiner

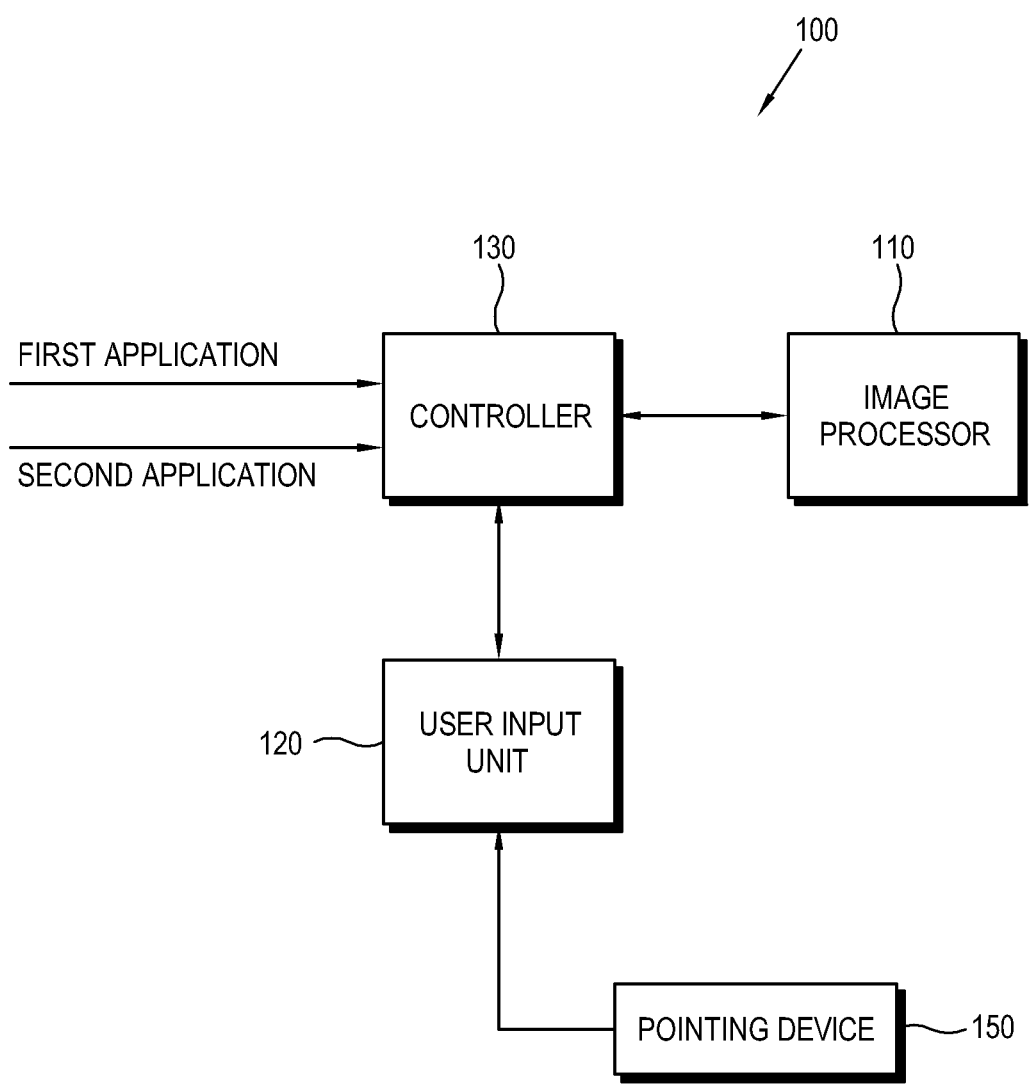

IMAGE PROCESSING APPARATUS AND CONTROLLING METHOD OF THE SAME

CROSS-REFERENCE TO RELATED APPLICATION

This is a divisional of a U.S. patent application Ser. No. 12/855,726, which claims priority from Korean Patent Applications No. 10-2009-0083338, filed on Sep. 4, 2009 and No. 10-2010-0013520, filed on Feb. 12, 2010 in the Korean Intellectual Property Office, the disclosures of which are incorporated herein by reference.

BACKGROUND

Field

Apparatuses and methods consistent with the exemplary embodiments relate to an image processing apparatus and a controlling method of the same, and more particularly, to an image processing apparatus and a controlling method of the same, in which when a plurality of applications controllable on a digital television (DTV) or a personal computer (PC) are executed at a time, the respective applications are simultaneously controlled through a single or a plurality of input devices, and cursors for simultaneously controlling the plurality of applications are displayed.

Description of the Related Art

As opposed to a related art analog-type TV that outputs and displays just one broadcasting image to a screen, a digital-type TV that has appeared in recent years can display two or more broadcasting images and content images at the same time. Further, as a processing performance of the TV is enhanced and contents are diversified, a recent trend changes from a unilateral TV, in which a user can only passively view a broadcast, to an interactive TV in which the screen is controllable by a user through an input device such as a remote controller, a mouse, or etc.

Particularly, there has recently been proposed a method of providing interactive contents such as a game, a digital contents management (DMC) or the like through the TV. However, a related art remote controller with only buttons is not sufficient to control such interactive contents in the TV. Accordingly, there has also been proposed a method of controlling the TV through an advanced input device having a higher degree of freedom like a cursor, a pointer, etc.

Generally, when a plurality of programs is running in a PC, only one window or program is activated at a time. In this case, it is possible to control only the activated window or program even if the plural programs are overlapped. Accordingly, one user may use and control the plurality of programs by directly switching the activated program.

However, if the plurality of programs are activated and needed to be simultaneously controlled independently of each other through the input devices, respectively, it is required to newly set up which cursor is assigned to which program and how the cursor operates.

SUMMARY

Accordingly, an aspect of the exemplary embodiments is to provide an image processing apparatus and a controlling method of the same, in which a plurality of applications can be controlled at the same time through one or a plurality of input devices in a DTV or a PC, and a single or plural cursors for simultaneously controlling the plurality of programs output to a screen can be displayed and moved.

The foregoing and/or other aspects may be achieved by providing a method of controlling an image processing apparatus, the method including: displaying a first screen corresponding to a first application; displaying a second screen corresponding to a second application above the first screen as overlapping each other; and displaying a part of the second screen, overlapped with the first screen, while controlling the first application.

In this method, at least one pointing cursor for controlling an application may be displayed on at least one of the first screen and the second screen. The pointing cursor may control an application corresponding to the most adjacent screen between the underlying first and second screens displayed overlapping each other. The pointing cursor may be movable to at least one location of below the first screen, above the first screen, between the first and second screens, and above the second screen. The pointing cursor may be changed in at least one of transparency, shape, brightness and color when transferred. The at least one pointing cursor may respectively correspond to at least one pointing device. The pointing cursor may include a first pointing cursor and a second pointing cursor, and the first pointing cursor and the second pointing cursor may control the first application and the second application, respectively. The first pointing cursor and the second pointing cursor may control an application corresponding to the most adjacent screen between the underlying first and second screens displayed overlapping each other when no screen is displayed corresponding to an application to be controlled. The first pointing cursor and the second pointing cursor may be changed in at least one of transparency, shape, brightness and color when controlling another application other than an application subject to control. The first pointing cursor and the second pointing cursor may be movable within a region of a screen corresponding to an application subject to control. The first pointing cursor and the second pointing cursor may be changed in at least one of transparency, shape, brightness and color when transferred beyond a movable region. The first pointing cursor and the second pointing cursor may correspond to a first pointing device and a second pointing device, respectively.

Another aspect may be achieved by providing a method of controlling an image processing apparatus, the method including: displaying a first screen corresponding to a first application and a second screen corresponding to a second application not to overlap each other; controlling at least one of the first application and the second application; and displaying an application to be recognizable by a user when the application subject to control is switched.

Still another aspect may be achieved by providing an image processing apparatus including an image processor which processes and displays an image; and a controller which controls the image processor to display a second screen corresponding to a second application above a first screen corresponding to a first application as overlapping each other and to display a part of the second screen, overlapped with the first screen, when controlling the first application.

Yet another aspect may be achieved by providing an image processing apparatus including: an image processor which processes and displays an image; and a controller which controls the image processor to display a first screen corresponding to a first application and a second screen corresponding to a second application not to overlap each other and to display an application to be recognizable by a user when the application subject to control is switched while controls at least one of the first application and the second application.

BRIEF DESCRIPTION OF THE DRAWINGS

The above and/or other aspects will become apparent and more readily appreciated from the following description of the exemplary embodiments, taken in conjunction with the accompanying drawings, in which:

FIG. 1 is a block diagram of an image processing apparatus according to an exemplary embodiment;

DETAILED DESCRIPTION OF EXEMPLARY EMBODIMENTS

Figure 2A:
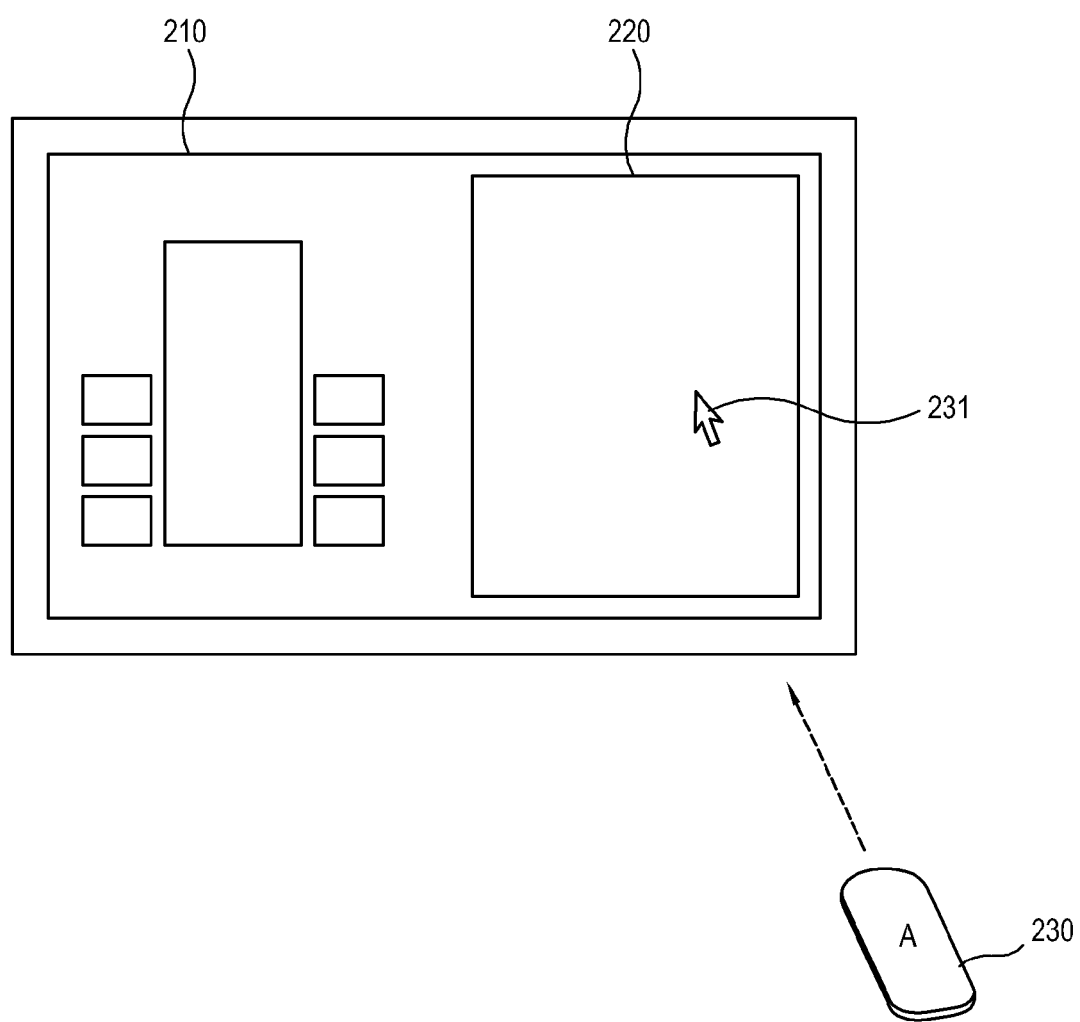
FIG. 2A shows a display in which one pointing cursor is displayed.

Below, exemplary embodiments will be described in detail with reference to accompanying drawings so as to be easily realized by a person having ordinary knowledge in the art. The exemplary embodiments may be embodied in various forms without being limited to the embodiments set forth herein. Descriptions of well-known parts are omitted for clarity, and like reference numerals refer to like elements throughout. Expressions such as "at least one of," when preceding a list of elements modify the entire list of elements and do not modify the individual elements of the list.

FIG. 1 is a block diagram of an image processing apparatus according to an exemplary embodiment.

An image processing apparatus 100 in this embodiment includes a DTV, a large format display (LFD), a desktop computer, a laptop computer, a mobile terminal, a set-top box, etc. Further, any electronic apparatus can be employed as the image processing apparatus 100 as long as it can execute a plurality of applications and be controlled by a pointing device 150.

The image processing apparatus 100 in this exemplary embodiment includes an image processor 110, a user input unit 120 and a controller 130.

The image processor 110 can process and display an image. Specifically, the image processor 110 displays a screen corresponding to an application, a pointing cursor for controlling the application, and a control object for performing a predetermined function. The control object may include a virtual slider, a virtual button, and other various graphic user interfaces.

Meanwhile, the image processor 110 may include a display panel (not shown) achieved in the form of a liquid crystal display (LCD), an organic light emitting diode (OLED), a plasma display panel (PDP), etc., and a panel driver (not shown).

The user input unit 120 may receive a control command from the pointing device 150. To this end, the user input unit 120 may perform wired/wireless communication such as infrared communication, Bluetooth communication, ZigBee communication, local area network communication, etc. Meanwhile, the control command may include at least one of a pointing operation and a certain key input.

With a control method of the image processing apparatus 100 according to the first exemplary embodiment, a first screen and a second screen may be displayed overlapping each other. For example, the controller 130 may control the image processor 110 so that the second screen corresponding to a second application can be displayed overlapping on the first screen corresponding to a first application, and a part of the second screen, overlapped with the first screen, can be displayed when the first application is controlled.

In this case, the controller 130 may control the image processor 110 to display at least one of the pointing cursors for controlling the application, on at least one of the first screen and the second screen.

According to an exemplary embodiment, the pointing cursor may control the application corresponding to the most adjacent screen between the underlying first screen and second screen displayed overlapping each other. At this time, the pointing cursor is movable to at least one location of below the first screen, above the first screen, between the first and second screens, and above the second screen. If the pointing cursor is transferred to a different location, at least one of the transparency, the shape, the brightness and the color of the pointing cursor may be changed, which will be described later with reference to FIGS. 2A to 2C.

According to another exemplary embodiment, the pointing cursor includes a first pointing cursor and a second pointing cursor, and the first pointing cursor and the second pointing cursor may control the first application and the second application, respectively. In this case, the first pointing cursor and the second pointing cursor may control the application corresponding to the most adjacent screen between the underlying first and second screens displayed overlapping each other when no screen is displayed corresponding to an application to be controlled. When controlling another application other than the application subject to control, the first pointing cursor and the second pointing cursor may be changed in at least one of the transparency, the shape, the brightness and the color thereof. Also, the first pointing cursor and the second pointing cursor are movable within a screen region corresponding to the application subject to the control. In this case, the first pointing cursor and the second pointing cursor may be changed in at least one of the transparency, the shape, the brightness and the color if transferred beyond a movable region, which will be described with reference to FIGS. 2D to 2F.

According to a method of controlling the image processing apparatus 100 according to a second exemplary embodiment, the first screen and the second screen may be displayed without overlapping each other. Specifically, the controller 130 controls the image processor 110 to display the first screen corresponding to the first application and the second screen corresponding to the second application without overlapping each other. The controller 130 also controls at least one of the first application and the second application, in which the image processor 110 is controlled to make a user recognize that the application subject to the control is switched.

In this case, the controller 130 controls the image processor 110 to display at least one of the pointing cursors for controlling the applications, on at least one of the first screen and the second screen.

According to an exemplary embodiment, the pointing cursor may control the application corresponding to the underlying-displayed first screen or the second screen. In this case, the pointing cursor is movable to at least one location of above the first screen, below the first screen, above the second screen, and below the second screen. If the pointing cursor is transferred to a different location, at least one of the transparency, the shape, the brightness and the color of the pointing cursor may be changed, which will be described later with reference to FIGS. 8A to 8B.

According to another exemplary embodiment, at least one pointing cursor includes the first pointing cursor and the second pointing cursor, and the first pointing cursor and the second pointing cursor may control the first application and the second application, respectively. In this case, the first pointing cursor and the second pointing cursor are movable within the screen region corresponding to the application subject to be controlled. Also, the first pointing cursor and the second pointing cursor may be changed in at least one of the transparency, the shape, the brightness and the color if transferred beyond the movable region, which will be described with reference to FIGS. 8C to 8D.

The pointing device 150 may include a mouse or a similar input unit based on a cursor. The pointing device 150 can transmit a control command input by a user to the image processing apparatus 100. To this end, the pointing device 150 can perform wired and wireless communication with the image processing apparatus 100.

In the meantime, there may be provided a plurality of pointing devices 150.

The plurality of pointing devices 150 may be assigned to the applications, respectively. For example, a pointing device A may be assigned to a broadcasting screen, and a pointing device B may be assigned to a game screen. In this case, a user employs the pointing device A to control a broadcasting view and the pointing device B to execute the game.

Also, the plurality of pointing devices 150 may be assigned according not to the respective applications, but to the applications where the pointing cursors of the pointing devices 150 are located. In more detail, if the pointing cursor corresponding to the pointing device 150 is placed in a certain screen, the pointing device 150 can be assigned to the application corresponding to the certain screen. For instance, the pointing device A may be assigned to the broadcasting screen or the game screen in accordance with the location of the pointing cursor A. If the pointing cursor A is located in a place where the broadcasting screen and the game screen are overlapped with each other, it is possible to control the application corresponding to the most adjacent screen among the underlying screens.

Below, the method of controlling the image processing apparatus according to the first exemplary embodiment will be described with reference to FIGS. 2A to 2F.

In the case that a game application and a broadcasting application are simultaneously executed in the DTV, screens corresponding to the respective applications may be displayed at a time.

In the method of controlling the image processing apparatus 100 according to the first exemplary embodiment, the first screen and the second screen may be displayed overlapping each other. Specifically, as shown in FIGS. 2A to 2F, a broadcasting screen 220 corresponding to the broadcasting application may be displayed overlapping on a game screen 210 corresponding to the game application. In this case, at least one pointing cursor for controlling the application may be displayed on at least one of the first and second screens. At least one pointing cursor may each correspond to at least one pointing device.

FIG. 2A illustrates that one pointing cursor is displayed.

A pointing cursor 231 corresponds to a pointing device A 230.

If the pointing device A 230 is assigned to the game screen 210 or the broadcasting screen 220 on the basis of the location of the pointing cursor 231, the pointing cursor 231 can control the application corresponding to the most adjacent screen between the underlying game screen 210 and broadcasting screen 220 displayed overlapping each other. Referring to FIG. 2A, a background→the game screen 210→the broadcasting screen 220→the pointing cursor 231 are arranged in sequence from a bottom layer to a top layer. In this case, the broadcasting screen 220 is a screen most adjacent to the pointing cursor 231 among the screens displayed under the pointing cursor 231 and overlapping one another. Therefore, the pointing cursor 231 can control the broadcasting screen 220.

Figure 2B:
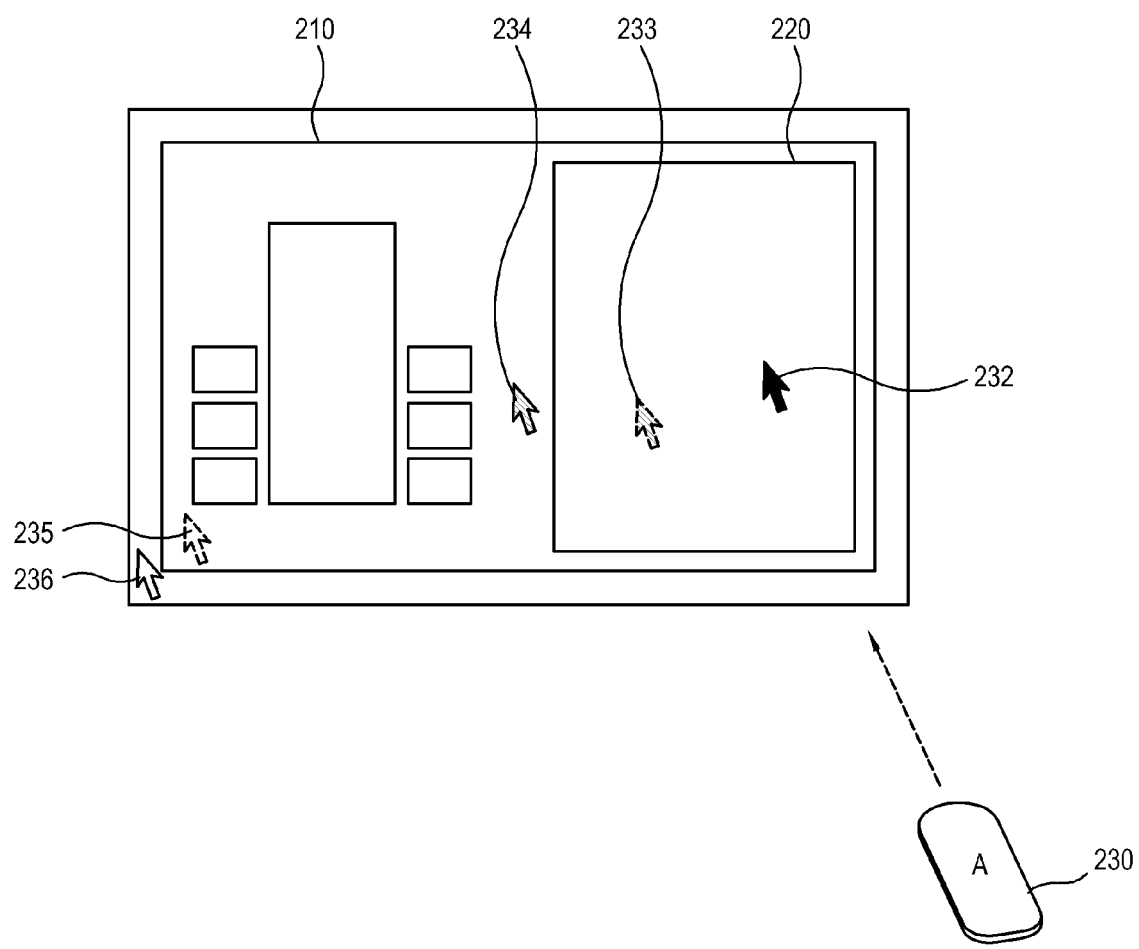
FIG. 2B shows a display in which the pointing cursor is changed in a form as being transferred between applications.

FIG. 2B illustrates that the form of the pointing cursor is changed when the pointing cursor is moved between the applications.

The pointing cursors 232, 233, 234, 235 and 236 may move between the game screen 210 and the broadcasting screen 220. Specifically, the pointing cursors 232, 233, 234, 235 and 236 may be moved to at least one location of below the game screen 210, above the game screen 210, between the game screen 210 and the broadcasting screen 220, and above the broadcasting screen 220. Further, the pointing cursor 232, 233, 234, 235 and 236 may be changed in at least one of the transparency, the shape, the brightness and the color as being moved from one location to another.

As shown in FIG. 2B, the brightness of the pointing cursor 232, 233, 234, 235, 236 becomes lower as it is being moved onto the lower layer. For example, in the case where the pointing cursor 232 moves from the broadcasting screen 220 to the game screen 210, it is changed into the pointing cursor 234 of which the brightness is lowered by a predetermined level. Further, if the pointing cursor 234 located on the game screen 210 is transferred below the game screen 210, it is changed into the pointing cursor 236 of which the brightness is lowered by a predetermined level.

Meanwhile, the pointing cursor 232 located on the broadcasting screen 220 may be moved between the game screen 210 and the broadcasting screen 220. In this case, the background→the game screen 210→the pointing cursors 233 and 234→the broadcasting screen 220 are arranged in sequence from the bottom layer to the top layer. Thus, the pointing cursor 234 located on the game screen 210 and the pointing cursor 233 located between the game screen 210 and the broadcasting screen 220 are provided on the same layer. However, differently from the former pointing cursor 234, because the latter pointing cursor 233 exists in a region where the game screen 210 and the broadcasting screen 220 overlap each other, the latter pointing cursor 233 is covered with the broadcasting screen 220. To display this, the outline of the pointing cursor 233 may be displayed in the form of a dotted line when being located between the game screen 210 and the broadcasting screen 220. However, since the former pointing cursor 234 and the latter pointing cursor 233 are provided on one layer, they have the same brightness.

Likewise, the pointing cursor 236 located under the game screen 210 and the pointing cursor 235 located between the background and the game screen 210 can be displayed having the same brightness, and the outline of the latter 235 can be displayed in the form of the dotted line.

If the pointing device A 230 is assigned to the game screen 210 or the broadcasting screen 220 on the basis of the location of the pointing cursor 232, 233, 234, 235, 236, the pointing cursor 232, 233, 234, 235, 236 controls the application corresponding to the most adjacent screen between the game screen 210 and the broadcasting screen 220 that underlies the pointing cursor 232, 233, 234, 235, 236. Specifically, referring to FIG. 2B, the pointing cursor 232 located on the broadcasting screen 220 can control the broadcasting screen 220. The pointing cursor 234 located on the game screen 210 and the pointing cursor 233 located between the game screen 210 and the broadcasting screen 220 can control the game screen 210. However, the pointing cursor 236 located below the game screen 210 and the pointing cursor 235 located between the background and the game screen 210 do not have any target to control.

Meanwhile, in the case of FIG. 2B, even though the pointing cursors 232, 233, 234, 235 and 236 move between the game screen 210 and the broadcasting screen 220, the game screen 210 and the broadcasting screen 220 are continuously displayed and do not disappear. Also, in the case of controlling the game screen 210, the broadcasting screen 220 displayed on a relatively upper layer is displayed as it is and does not disappear.

Figure 2C:
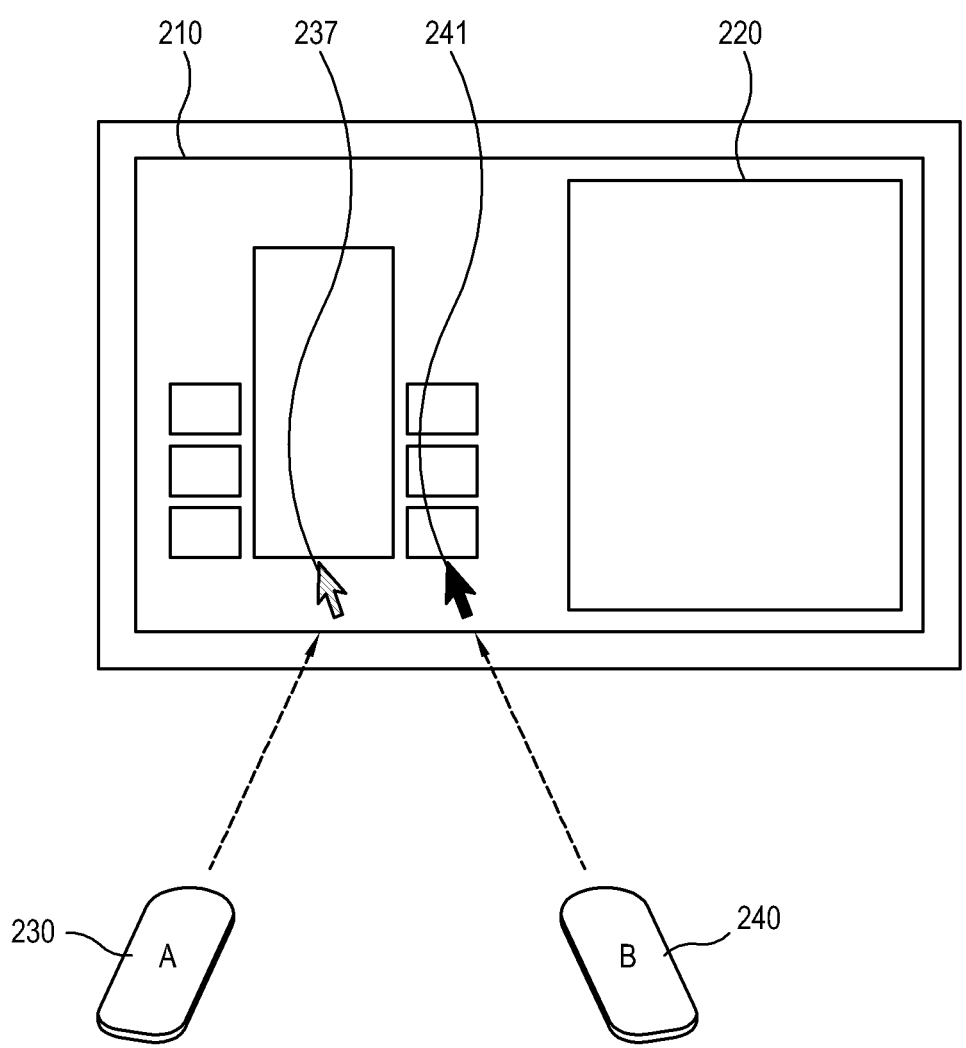
FIG. 2C shows a display in which two pointing cursors are displayed.

FIG. 2C illustrates that two pointing cursors are displayed.

The pointing cursor A 237 corresponds to the pointing device A 230, and the pointing cursor B 241 corresponds to the pointing device B 240. In FIG. 2C, the pointing cursor A 237 and the pointing cursor B 241 are displayed on the game screen 210.

If the pointing device A 230 and the pointing device B 240 are assigned to the game screen 210 or the broadcasting screen 220 on the basis of the locations of the pointing cursor A 237 and the pointing cursor B 241, respectively, the pointing cursor A 237 and the pointing cursor B 241 can control the application corresponding to the most adjacent screen between the game screen 210 and the broadcasting screen 220 that underlies the pointing cursor A 237 and the pointing cursor B 241.

Referring to FIG. 2C, the background→the game screen 210→the pointing cursor A 237, the pointing cursor B 241→the broadcasting screen 220 are arranged in sequence from the bottom layer to the top layer. In this case, the game screen 210 is the most adjacent screen to the pointing cursor A 237 among the screens underlying the pointing cursor A 237 and overlapping each other. Also, the game screen 210 is the most adjacent screen to the pointing cursor B 241 among the screens underlying the pointing cursor B 241. Thus, both the pointing cursor A 237 and the pointing cursor B 241 can control the game screen 210. For example, a plurality of users can play a game together.

Figure 2D:
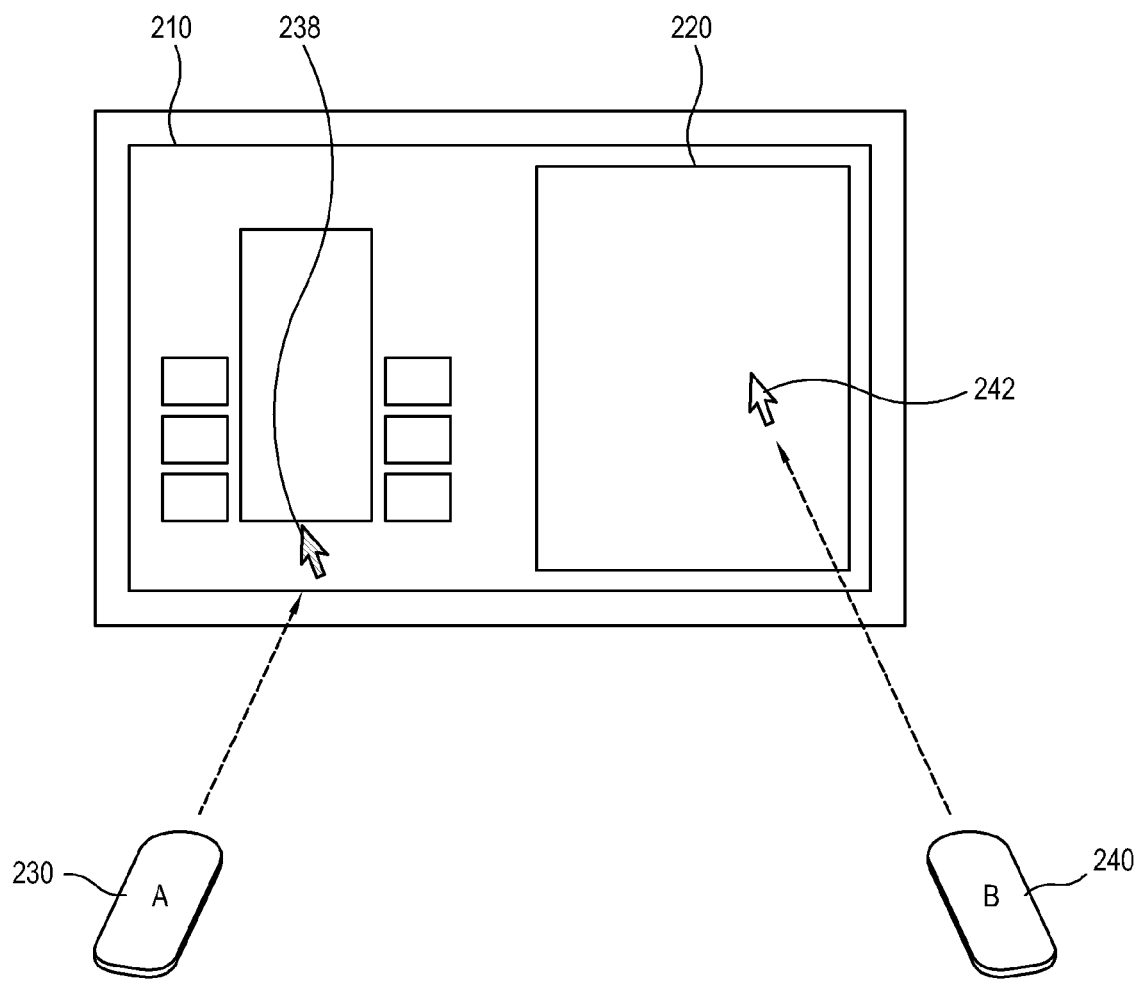
FIG. 2D shows a display in which a plurality of applications are controlled by a plurality of pointing devices, respectively.

FIG. 2D illustrates that a plurality of applications are controlled by a plurality of pointing devices, respectively.

If the pointing device A 230 is assigned to the game screen 210 and the pointing device B 240 is assigned to the broadcasting screen 220, the pointing cursor A 238 can control the game screen 210 and the pointing cursor B 242 can control the broadcasting screen 220. Referring to FIG. 2D, the background→the game screen 210→the pointing cursor A 238→the broadcasting screen 220→the pointing cursor B 242 are arranged in sequence from the bottom layer to the top layer. Thus, the pointing cursor B 242 is located in a region where the game screen 210 and the broadcasting screen 220 overlap each other. However, since the pointing cursor B 242 can control only the broadcasting screen 220, the game screen 210 is not controlled by a user manipulating the pointing cursor B 242. In this case, only the broadcasting screen 220 is controllable.

On the other hand, if the pointing device B 240 is assigned to the game screen 210 and the pointing device A 230 is assigned to the broadcasting screen 220, the pointing cursor B 242 can control the game screen 210 and the pointing cursor A 238 can control the broadcasting screen 220. Referring to FIG. 2D, the pointing cursor B 242 is located in the region where the game screen 210 and the broadcasting screen 220 overlap each other. However, since the pointing cursor B 242 can control only the game screen 210, the broadcasting screen 220 is not controlled even though a user manipulates the pointing cursor B 242. The pointing cursor A 238 is located beyond the broadcasting screen 220. Because the pointing cursor A 238 can control only the broadcasting screen 220, the game screen 210 is not controlled even though a user manipulates the pointing cursor A 238.

Figure 2E:
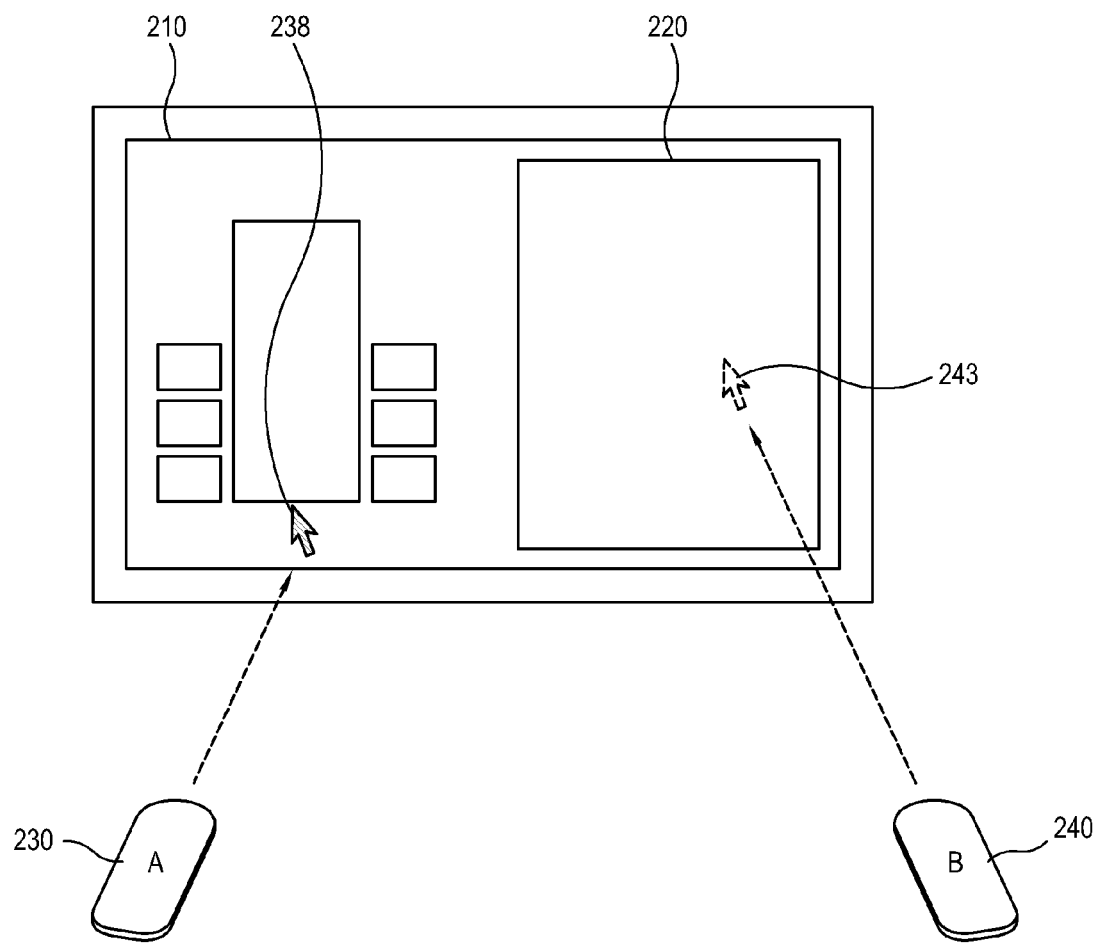
FIG. 2E shows a display in which a screen corresponding to an application to be controlled is not displayed yet.

FIG. 2E shows a display in which a screen corresponding to an application subject to control is not yet displayed.

In FIG. 2E, the broadcasting screen 220 subject to the control of the pointing device B 240 is not yet displayed. For example, there may be a case in which broadcasting contents are being loaded. In this case, the pointing cursor B 243 has no target to be controlled. Thus, the pointing cursor B 243 may control an application corresponding to the most adjacent screen among the screens underlying the pointing cursor B 243 and overlapping each other besides the broadcasting screen 220. Referring to FIG. 2E, the background-→the game screen 210→the pointing cursor A 238→the broadcasting screen 220→the pointing cursor B 243 are arranged in sequence. Thus, the pointing cursor B 243 can control the game screen 210 since the game screen 210 is the most adjacent screen among the screens underlying the pointing cursor B 243 and overlapping each other.

In the meantime, if the pointing cursor B 243 controls the game screen 210 other than the broadcasting screen 220 subject to the control, the outline of the pointing cursor B 243 may be displayed in the form of a dotted line.

Figure 2F:
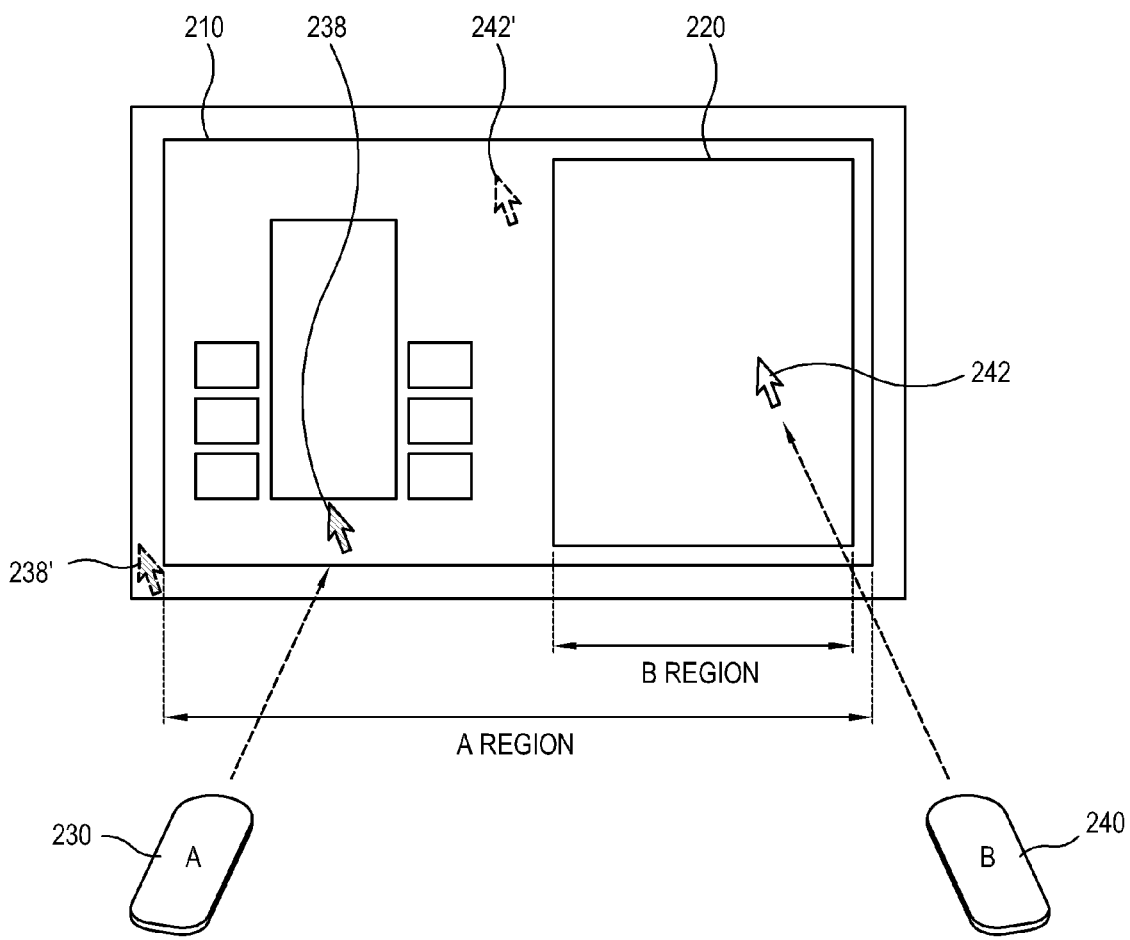
FIG. 2F shows a display including a region where a pointing cursor is movable.

FIG. 2F illustrates a region where the pointing cursor is movable.

The pointing cursor A 238 is movable within the region of the game screen 210 subject to the control thereof. Likewise, the pointing cursor B 242 is movable within the region of the broadcasting screen 220 subject to the control thereof. That is, as shown in FIG. 2F, the pointing cursor A 238 is movable within the region A, and the pointing cursor B 242 is movable within the region B.

In this case, if the pointing cursor A 238 and the pointing cursor B 242 are located beyond their respective movable regions, the outlines thereof may be changed into the dotted line. Referring to FIG. 2F, the outlines of the pointing cursor A 238' located beyond the region A and the pointing cursor B 242' located beyond the region B are displayed in the form of the dotted line.

Below, a method of controlling the image processing apparatus according to an exemplary embodiment will be described in more detail.

Figure 3:
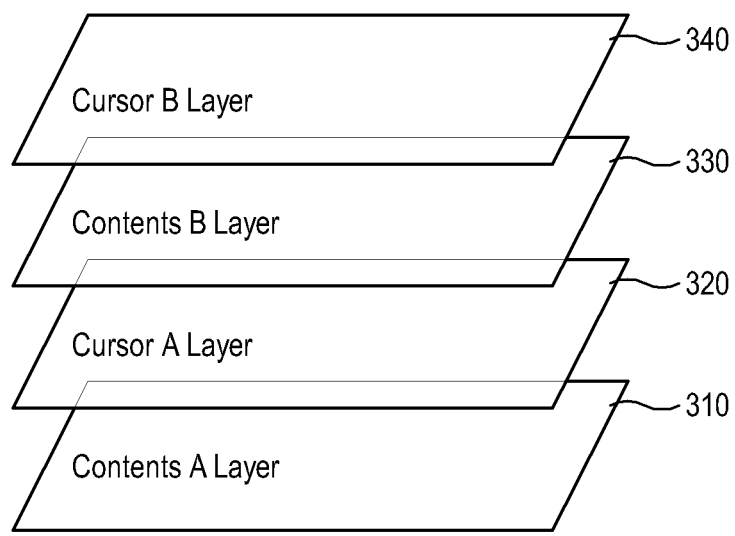
FIG. 3 shows a configuration of layers according to an exemplary embodiment.

FIG. 3 shows a configuration of layers according to an exemplary embodiment.

A layer or a graphic layer is a plane where an image is located. On the layer are located a screen corresponding to an application, a pointing cursor corresponding to a pointing device, a control object for performing a predetermined function, etc.

A content layer is a layer where a screen corresponding to an application is located. A cursor layer is a layer where a pointing cursor corresponding to a pointing device is located. A control object layer is a layer where a control object for performing a predetermined function is located.

The screen, the pointing cursor and the control object undergo different image processes, respectively. Thus, the image processing apparatus 100 individually processes the screen, the pointing cursor and the control object and displays them on the corresponding layers, respectively, in which the plurality of layers are arranged overlapping each other. In this case, it looks to a user that the pointing cursor and the control object overlap each other on the screen.

In general, under environments of the existing PC, e.g., under window environments of Microsoft operating system (MS_OS) or Linux, the cursor layer is set on a topmost graphic layer. In this case, it is determined whether to perform execution by calculating coordinates that the cursor indicates on activated content among the programs executed in the lower layers. Generally, the activated content is a program located directly beneath the cursor layer. That is, it is generally possible to control only the program located directly beneath the cursor because only one cursor layer is set.

On the other hand, in this exemplary embodiment, the cursor layers are set corresponding to content layers. Therefore, it is possible to simultaneously control a plurality of applications.

However, the cursor layers are set corresponding to the content layers, but the cursor may be set corresponding to the contents or may not be set corresponding to the contents. For example, as described with reference to FIGS. 2A to 2C, the cursor may be set in accordance with the application where the cursor is located. Also, as described with reference to FIGS. 2D to 2F, the cursor may be set in accordance with the application.

The cursor layer is located on top of the corresponding content layer. Specifically, as shown in FIG. 3, a cursor A layer 320 is located on top of a content A layer 310, and a cursor B layer 340 is located on top of a content B layer 330. In this case, a user controls the contents displayed on the content A layer 310 through the cursor displayed on the cursor A layer 320, and controls the contents displayed on the content B layer 330 through the cursor displayed on the cursor B layer 340.

Meanwhile, the content displayed on each content layer does not always use the full layer, but may use only a portion of the layer. For example, the screen or the cursor may be displayed in only a part of a display unit. At this time, a region in which the cursor displayed on each cursor layer is movable may be limited to a content region displayed on the corresponding content layer. For instance, the cursor displayed on the cursor A layer 320 is movable within only the content region displayed on the content A layer 310, and the cursor displayed on the cursor B layer 340 is movable within only the content region displayed on the content B layer 330.

The cursor displayed on a cursor layer other than the topmost cursor layer may be covered with the contents, the cursor or the like displayed on an upper layer. In this case, the position of the cursor located on the lower layer may be displayed in the form of a translucent, opaque, transparent or other symbol, or may not be displayed. For example, the cursor displayed on the cursor A layer 320 may be displayed transparently or not displayed as being covered with the contents displayed on the content B layer 330.

Figure 4A:
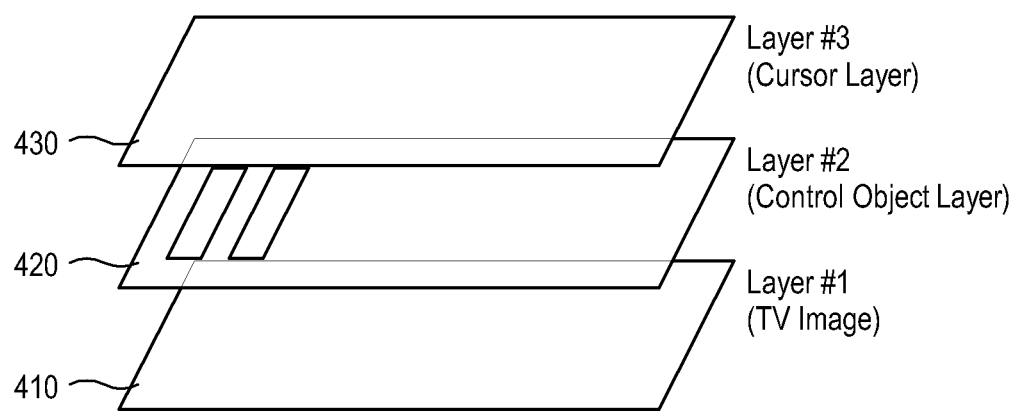
FIG. 4A shows a configuration of layers according to another exemplary embodiment.

FIG. 4A illustrates a configuration of a layer according to another exemplary embodiment.

A control object layer is located between a relevant content layer and a relevant cursor layer. Specifically, as shown in FIG. 4A, a control object layer (Layer #2) 420 where a control object is displayed is located between a content layer (Layer #1) 410 where a corresponding TV image is displayed and a cursor layer (Layer #3) 430 where a corresponding cursor is displayed.

In this case, the cursor layer 430 is located on the top, the control object layer 420 is located in the middle, and the content layer 410 is located on the bottom. Here, the higher the number, the higher the layer.

A user can control a predetermined function related to a content displayed on the content layer 410 through the control object displayed on the control object layer 420. In more detail, the control object is controlled through the cursor displayed on the cursor layer 430, thereby controlling a predetermined function of the content.

Meanwhile, according to a modified exemplary embodiment, the control object may be included in the content layer without any separate control object layer. In this case, a user may use the cursor and directly execute the control object displayed on the content layer corresponding to the cursor. For example, if a screen-control user interface is included in a game screen, a user may use the cursor and directly control the control object displayed on the content layer.

Figure 4B:
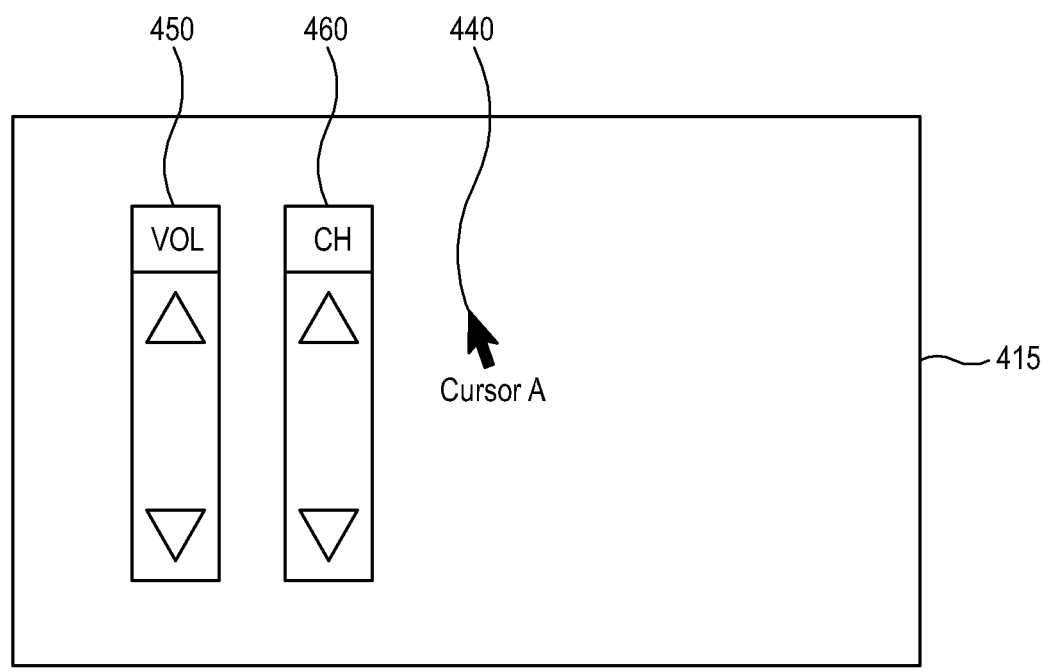
FIG. 4B shows a screen displayed in the case of FIG. 4A.

FIG. 4B shows a screen displayed in the case of FIG. 4A.

If a user watches TV while controlling a channel, volume, etc. through the pointing device A, the cursor A 440 corresponding to the pointing device A, a control object (VOL) 450 for performing volume control, and a control object (CH) 460 for performing channel change are displayed on a TV screen 415.

In the case that a user controls the cursor A 440 through the pointing device A, for example, if a pointing operation is performed through a button, a touch pad, etc. provided in the pointing device A, the controller 130 recognizes two-dimensional coordinates (x, y) on the cursor layer 430 where the cursor A 440 is located. At this time, the controller 130 executes the control object corresponding to the two-dimensional coordinates (x, y) of the recognized cursor A 440 among the control objects (e.g., VOL 450 and CH 460) provided on the control object layer 420.

Figure 5A:
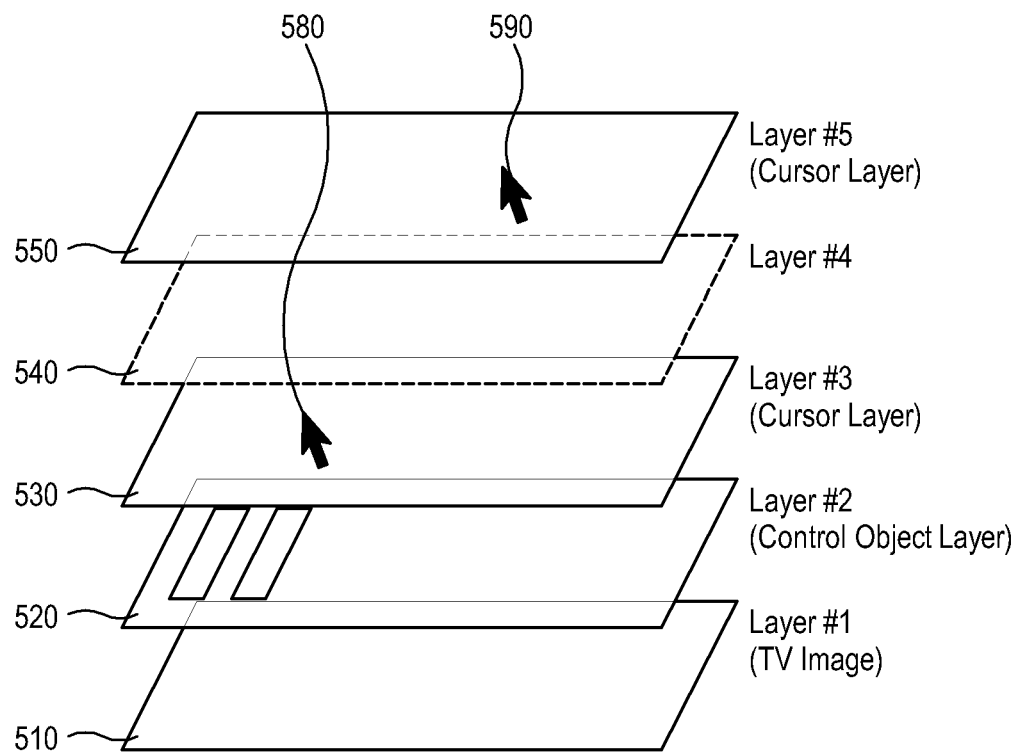
FIG. 5A shows a configuration of layers according to still another exemplary embodiment.

FIG. 5A illustrates a configuration of a layer according to still another exemplary embodiment.

Referring to FIG. 5A, the pointing device A and the pointing device B are connected to the image processing apparatus 100. For example, the cursor A 580 corresponding to the pointing device A may be displayed on the layer #3 530, and the cursor B 590 corresponding to the pointing device B may be displayed on the layer #5 550.

However, contents are not yet displayed on the content layer 540 corresponding to the layer #5 550.

For instance, while a user A controls a broadcasting screen through the pointing device A, a user B can execute a game through the pointing device B. When a user B newly connects the pointing device B to the image processing apparatus 100 being controlled by the existing pointing device A, the cursor B 590 corresponding to the pointing device B is displayed on the layer #5 550 provided above the layer #3 530 where the existing cursor A 580 is located. Then, the game contents will be loaded and displayed onto the layer #4 540, but nothing is currently displayed on the layer #4 540. In this case, since there is no content displayed on the control object layer or the content layer corresponding to the cursor B 590 before loading and displaying the game contents, the current cursor B 590 has no target to be controlled. Thus, the cursor B 590 may search the lower layers and control the control object provided in the layer #2 520 or the broadcasting image displayed on the layer #1 510.

Figure 5B:
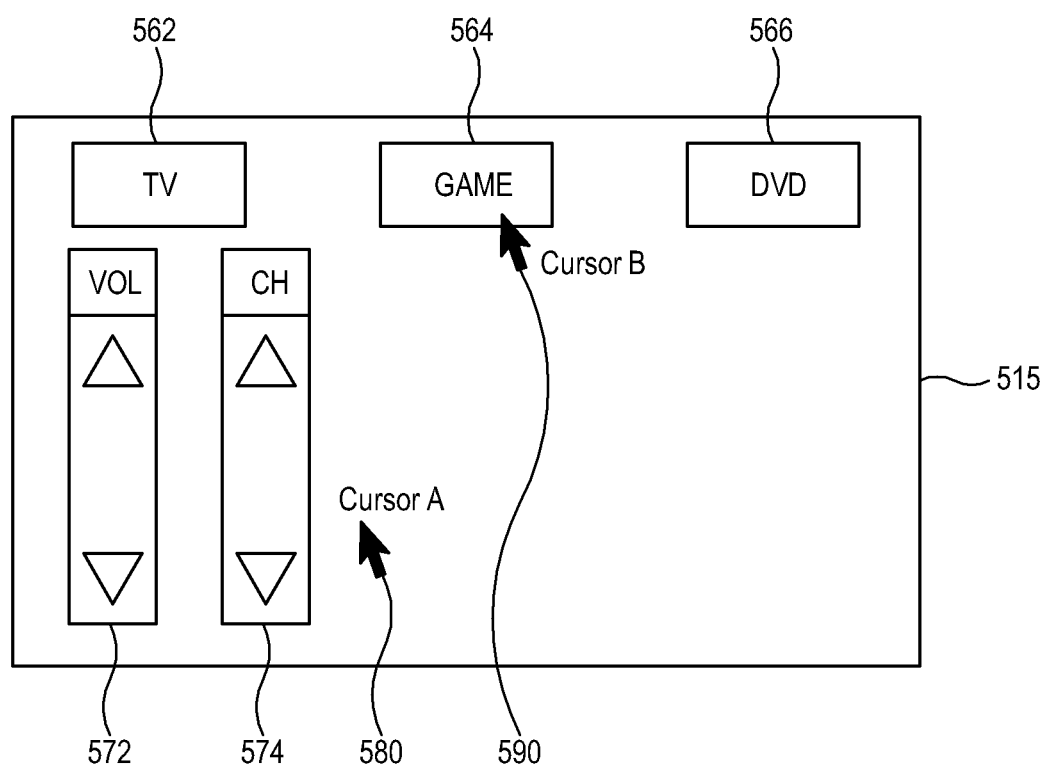
FIG. 5B shows a screen displayed in the case of FIG. 5A.

In the case of using the cursor B 590 corresponding to the layer #4 540 to control the control object displayed on the layer #2 520, the image processing apparatus 100 executes the control object on the layer #2 520 corresponding to the coordinates (x, y) of the cursor B displayed on the layer #5 550. If a user selects and executes a game 564 through the cursor B 590 as shown in FIG. 5B, game contents are loaded and a game screen is displayed. In this case, the game screen is displayed on the content layer or control object layer corresponding to the layer #5 550 so that it can be controlled by the cursor B 590 displayed on the layer #5 550. In FIG. 5A, the game screen will be displayed below the layer #5 550, i.e., on the layer #4 540.

In this exemplary embodiment, the cursor A 580 is movable on a full two-dimensional space of the layer #3 530, but the cursor B 590 may be movable within a limited range of the two-dimensional space of the layer #5 550, i.e., within a space corresponding to coordinates where the contents are located actually. This is convenient in light of controlling the cursor. That is, if a two-dimensional size of contents located on an upper content layer is smaller than that of contents located on the lower content layer, it is more convenient from the point of view of control that a space where an upper cursor is movable is limited to the size of the corresponding contents.

Meanwhile, the cursor A 580 displayed on the layer #3 530 may be located within a content region displayed on the layer #4 540. For example, the cursor A 580 may be located in a region where the broadcasting screen displayed on the layer #1 510 and the game screen displayed on the layer #4 540 overlap each other. At this time, the cursor A 580 cannot control the game screen displayed on the layer #4 540 because it is located on the cursor layer 530 corresponding to the layer #1 510. Here, the cursor A 580 may be displayed translucently together with the game screen of the upper content layer, or a virtual cursor may be displayed in the form of a specific symbol or shape instead of the cursor A 580. Thus, a user can easily determine in which layer the cursor A 580 is located. However, the virtual cursor is not the real cursor but a cursor of the lower layer, which is displayed as an image on the upper layer. Accordingly, the selection or execution is not performed even if the content or control object displayed on the upper layer is controlled through the virtual cursor.

FIG. 5B shows a screen displayed in the case of FIG. 5A.

Since the game screen is not yet displayed on the layer #4 540, only one screen, i.e., the broadcasting screen 515 is being displayed. Further, the control objects (i.e., TV 562, GAME 564, DVD 566, VOL 572, CH 574) for performing predetermined functions to be implemented on the broadcasting screen 515, the cursor A 580 and the cursor B 590 are displayed on the broadcasting screen 515.

Figure 6A:
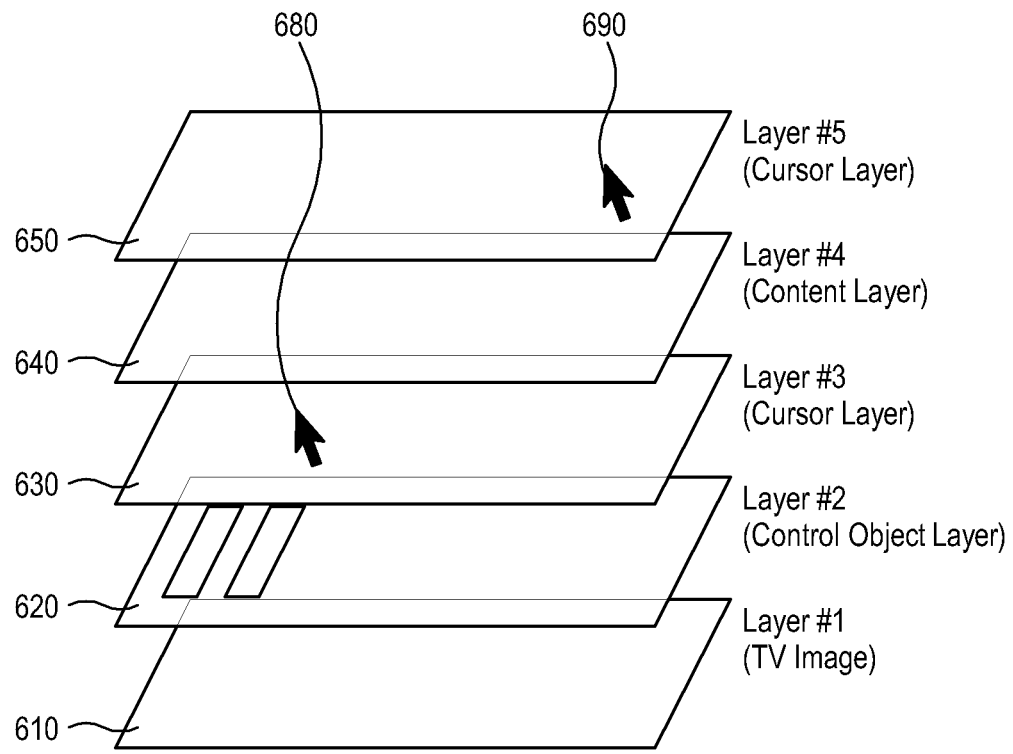
FIG. 6A shows a configuration of layers according to still another exemplary embodiment.
Figure 6B:
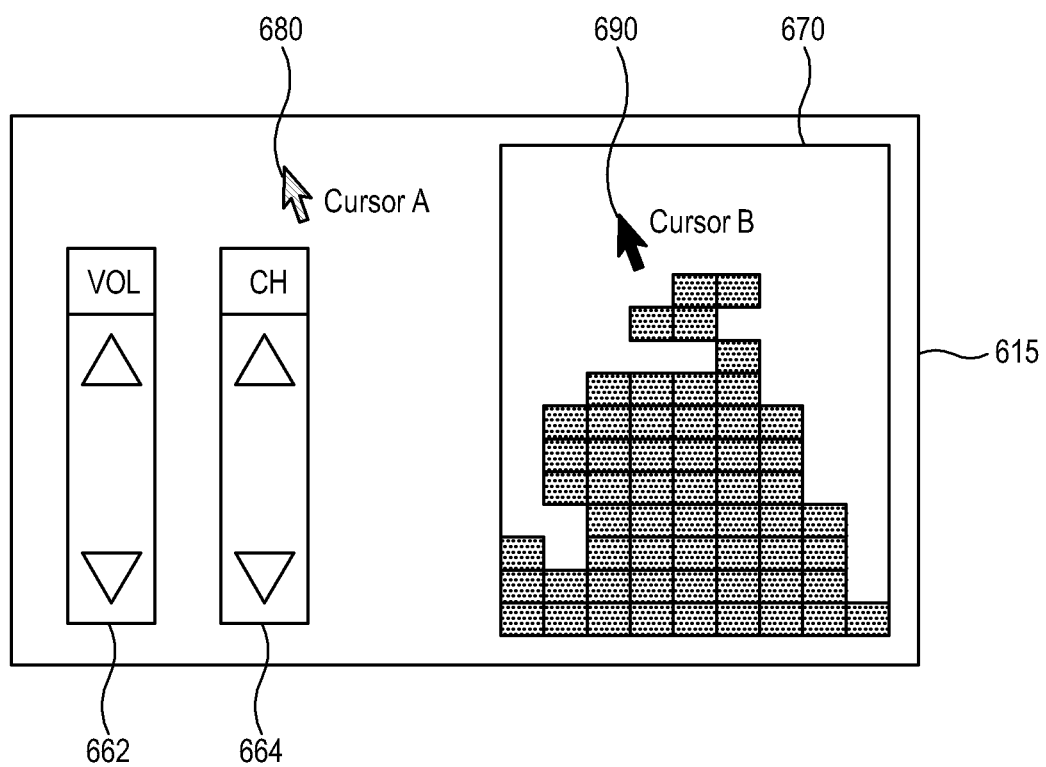
FIG. 6B shows a screen displayed in the case of FIG. 6A.

FIG. 6A shows a configuration of layers according to still another exemplary embodiment, and FIG. 6B shows a screen displayed in the case of FIG. 6A.

When game contents are loaded in a layer state of FIG. 5A, a game screen may be displayed on the content layer (layer #4) 640 as shown in FIG. 6A. In other words, the game screen is displayed on the layer #4 640 corresponding to the layer #5 650 where the cursor B 690 is displayed.

In this case, a user can control the game screen 670 through the cursor B 690 as shown in FIG. 6B. Also, a broadcasting screen 615 or the control objects (VOL) 662 and (CH) 664 can be controlled through the cursor A 680.

Figure 7A:
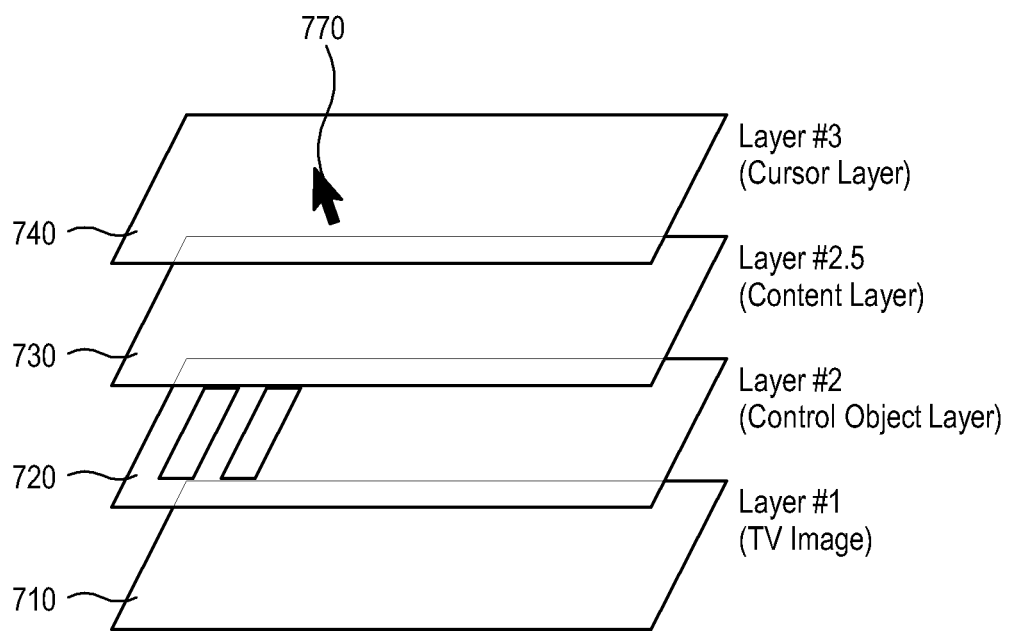
FIG. 7A shows a configuration of layers according to still another exemplary embodiment.
Figure 7B:
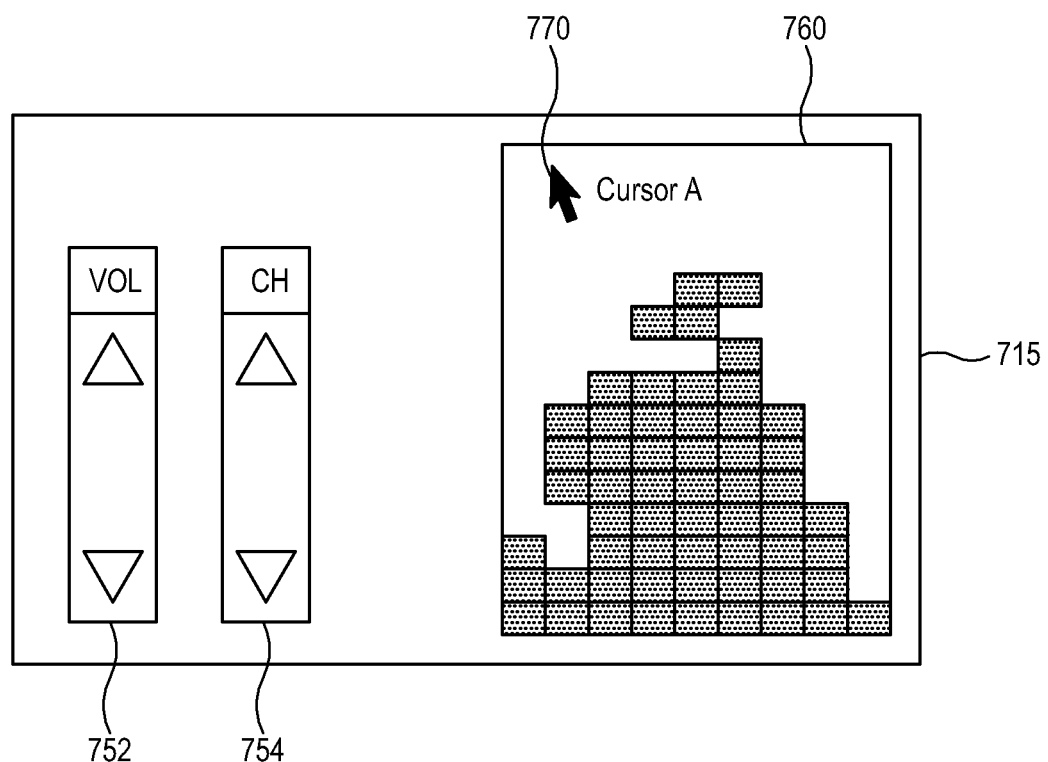
FIG. 7B shows a screen displayed in the case of FIG. 7A.

FIG. 7A shows a configuration of layers according to still another exemplary embodiment, and FIG. 7B shows a screen displayed in the case of FIG. 7A.

A user may control a game screen 760 through a cursor A 770 located on the layer #3 740. A user may not control broadcasting screen 715 by using cursor A 770.

In FIG. 6A, the game screen 670 is controlled through the cursor B 690. Thus, the game screen 670 is displayed on the layer #4 640 corresponding to the layer #5 650 where the cursor B 690 is displayed.

However, in the exemplary embodiment of FIGS. 7A and 7B, the game screen 760 is controlled through the cursor A 770, so that the game screen 760 may be loaded into the layer #2.5 730 between the layer #3 740 and the layer #2 720 as shown in FIG. 7A. Accordingly, to control a new content layer through a cursor on a certain cursor layer, the newly created content layer may be located below the certain cursor layer. Further, if the new content layer overlaps with the control object located below the certain cursor layer, a control object of an upper content layer may be executed.

In this case, a user may control the game screen 760 through the cursor A 770 as shown in FIG. 7B.

Below, a method of controlling the image processing apparatus 100 according to a second exemplary embodiment will be described with reference to FIGS. 8A to 8D.

In the method of controlling the image processing apparatus 100 according to the second exemplary embodiment, a first screen and a second screen may be displayed not to overlap each other. Specifically, as shown in FIGS. 8A to 8D, a game screen 810 and a broadcasting screen 820 may be displayed independently of each other. In this case, at least one pointing cursor for controlling an application may be displayed on at least one of the game screen 810 and the broadcasting screen 820. At least one pointing cursor may correspond to at least one pointing device, respectively.

Figure 8A:
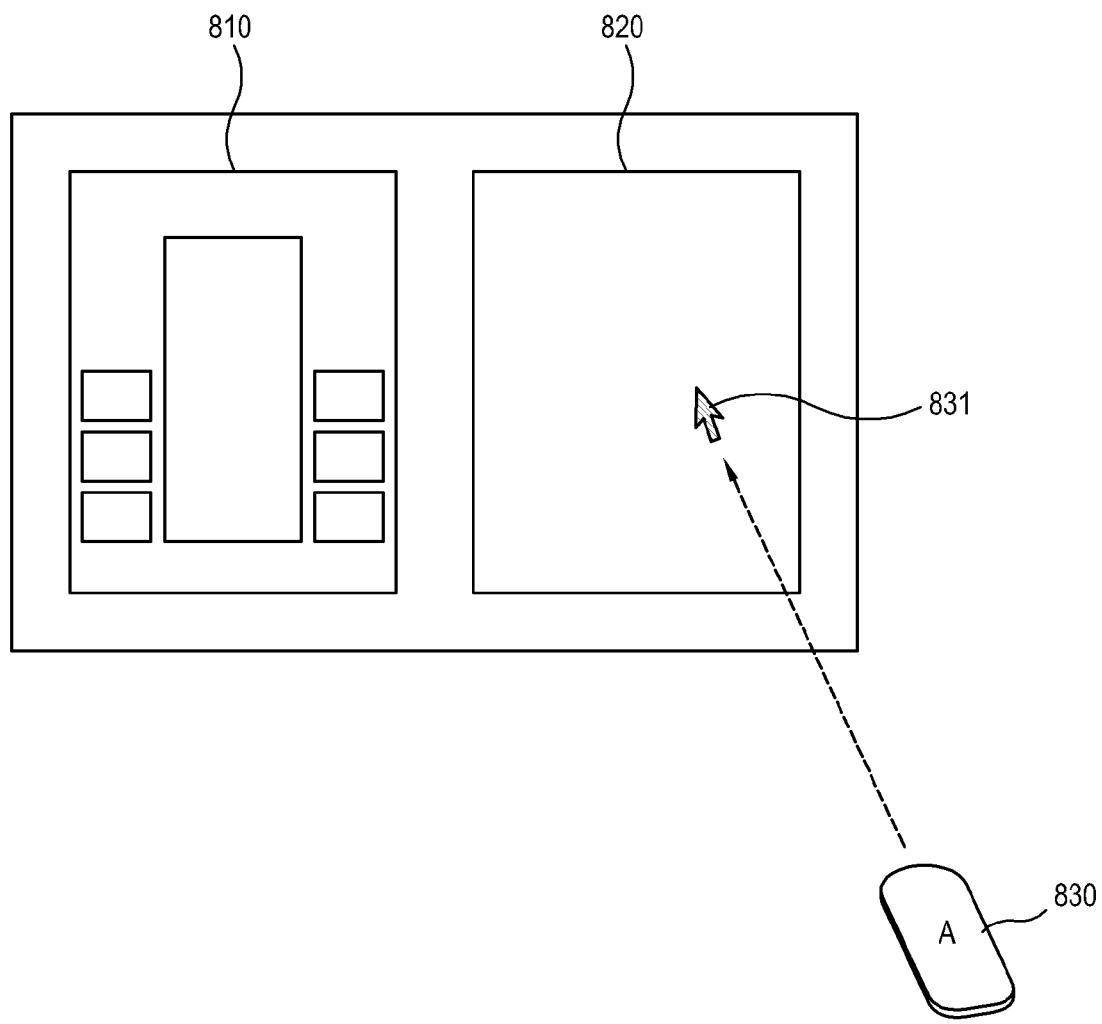
FIG. 8A shows a display in which one pointing cursor is displayed.

FIG. 8A shows that one pointing cursor is displayed.

A pointing cursor 831 corresponds to a pointing device A 830.

If the pointing device A 830 is assigned to the game screen 810 or the broadcasting screen 820 on the basis of the location of the pointing cursor 831, the pointing cursor 831 can control the game screen 810 or broadcasting screen 820 displayed underlying the pointing cursor 831.

In FIG. 8A, the screen displayed underlying the pointing cursor 831 is the broadcasting screen 820. Therefore, the pointing cursor 831 can control the broadcasting screen 820.

Figure 8B:
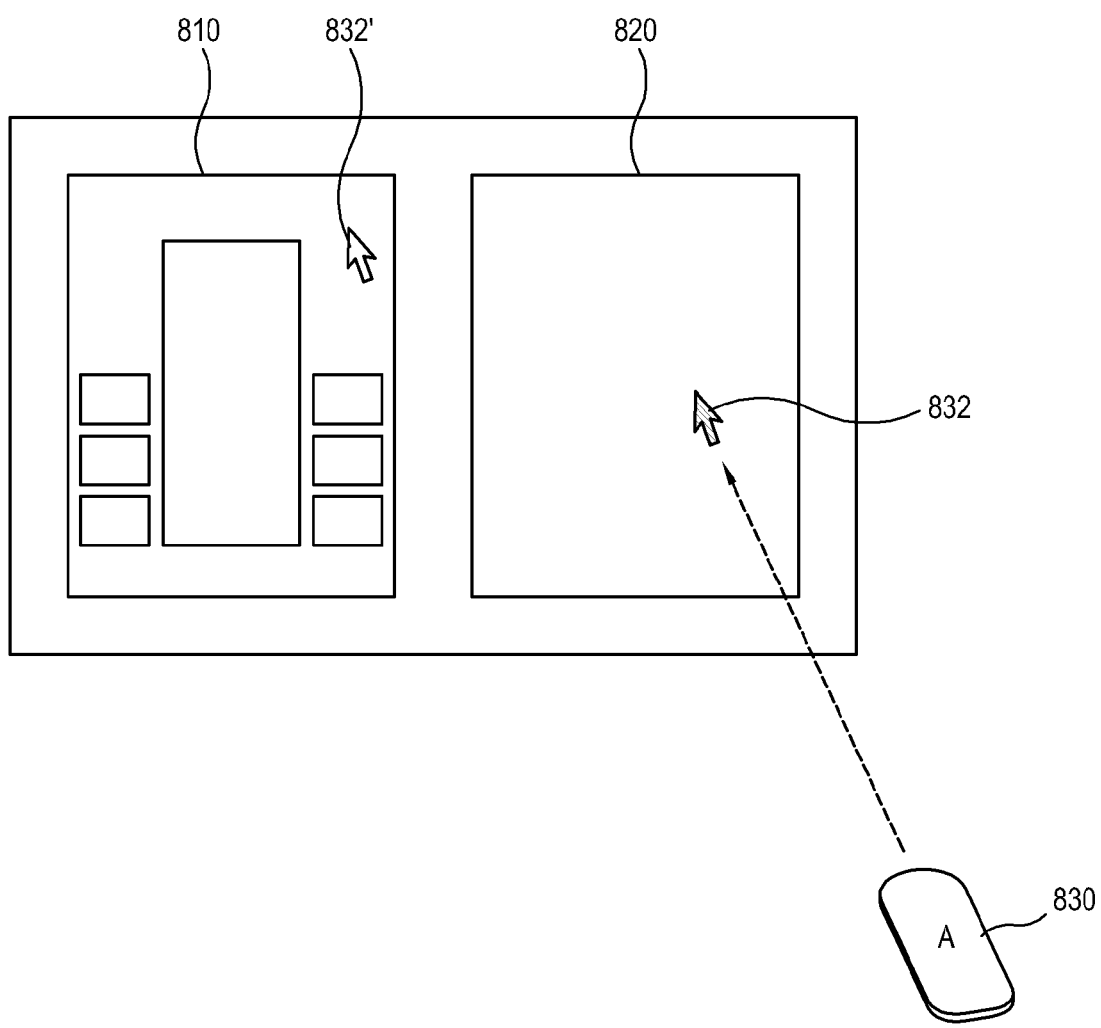
FIG. 8B shows a display in which the form of the pointing cursor is changed as the cursor is transferred between applications.

FIG. 8B illustrates that the form of the pointing cursor may be changed as it is moved between applications.

The pointing cursors 832, 832' may be moved between the game screen 810 and the broadcasting screen 820. Specifically, the pointing cursors 832, 832' is movable to at least one location of above the game screen 810, below the game screen 810, above the broadcasting screen 820, and below the broadcasting screen 820. If the pointing cursor 832, 832' is moved from one of these locations to another, at least one of the transparency, the shape, the brightness and the color of the pointing cursor 832, 832' may be changed.

If the pointing device A 830 is assigned to the game screen 810 or the broadcasting screen 820 on the basis of the location of the pointing cursor 831, and the pointing cursor 832 is located on the broadcasting screen 820 as shown in FIG. 8B, the pointing cursor 832 can control the broadcasting screen 820.

However, if the pointing cursor 832' moves below the game screen 810, the pointing cursor 832' cannot control the game screen 810. In this case, the pointing cursor 832' may be displayed transparently as being covered by the game screen 810.

Figure 8C:
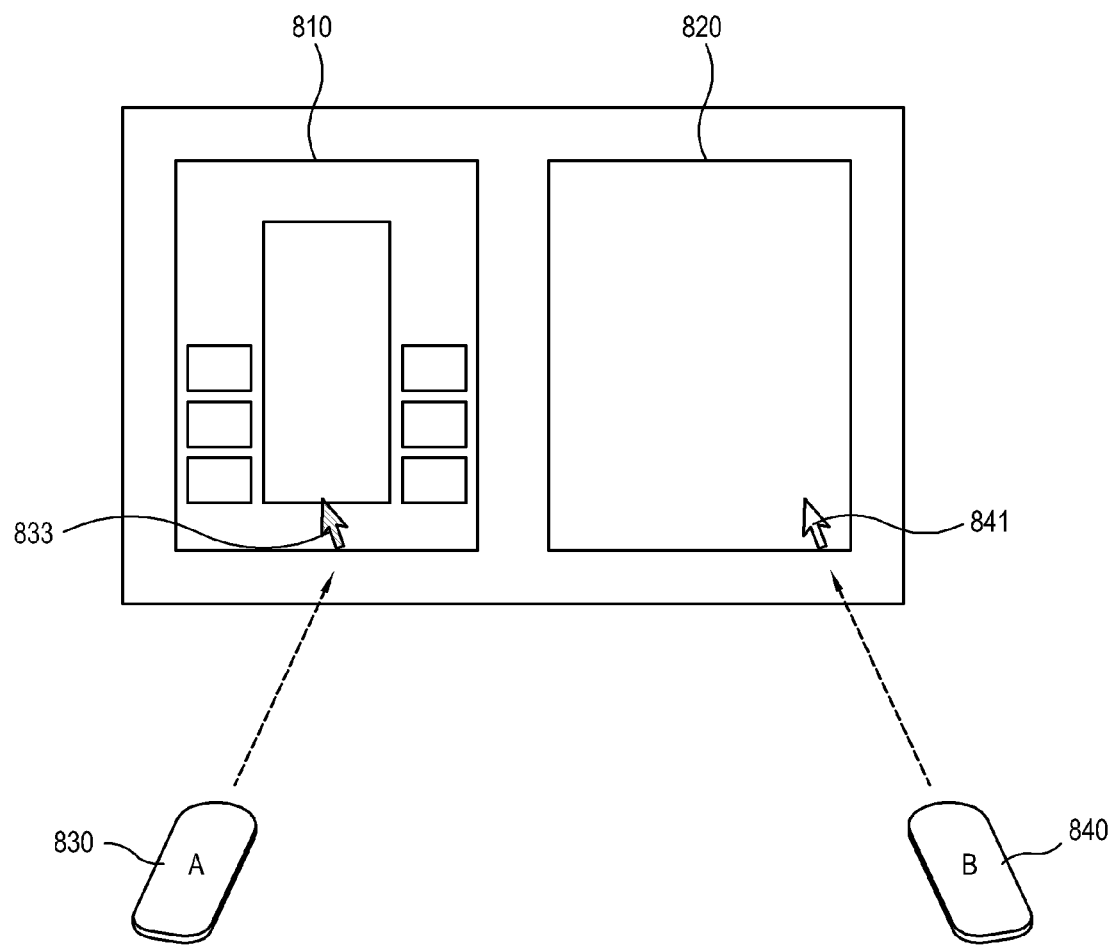
FIG. 8C shows a display in which the plurality of applications are controlled by a plurality of pointing devices, respectively.

FIG. 8C illustrates a display in which a plurality of applications are controlled by a plurality of pointing devices, respectively.

The pointing cursor A 833 corresponds to the pointing device A 830, and the pointing cursor B 841 corresponds to the pointing device B 840.

If the pointing device A 830 is assigned to the game screen 810 and the pointing device B 840 is assigned to the broadcasting screen 820, the pointing cursor A 833 can control the game screen 810 and the pointing cursor B 841 can control the broadcasting screen 820. Referring to FIG. 8C, the pointing cursor A 833 and the pointing cursor B 841 are located within the regions of the game screen 810 and the broadcasting screen 820 to be controlled, respectively. Thus, the pointing cursor A 833 and the pointing cursor B 841 can control the game screen 810 and the broadcasting screen 820, respectively.

On the other hand, if the pointing device B 840 is assigned to the game screen 810 and the pointing device A 830 is assigned to the broadcasting screen 820, the pointing cursor B 841 can control the game screen 810 and the pointing cursor A 833 can control the broadcasting screen 820. Referring to FIG. 8C, the pointing cursor A 833 is located on the game screen 810. That is, since the pointing cursor A 833 is located beyond the region of the broadcasting screen 820 to be controlled, it cannot control the broadcasting screen 820. Also, the pointing cursor B 841 is located on the broadcasting screen 820. That is, since the pointing cursor B 841 is located beyond the region of the game screen 810 to be controlled, it cannot control the game screen 810.

Figure 8D:
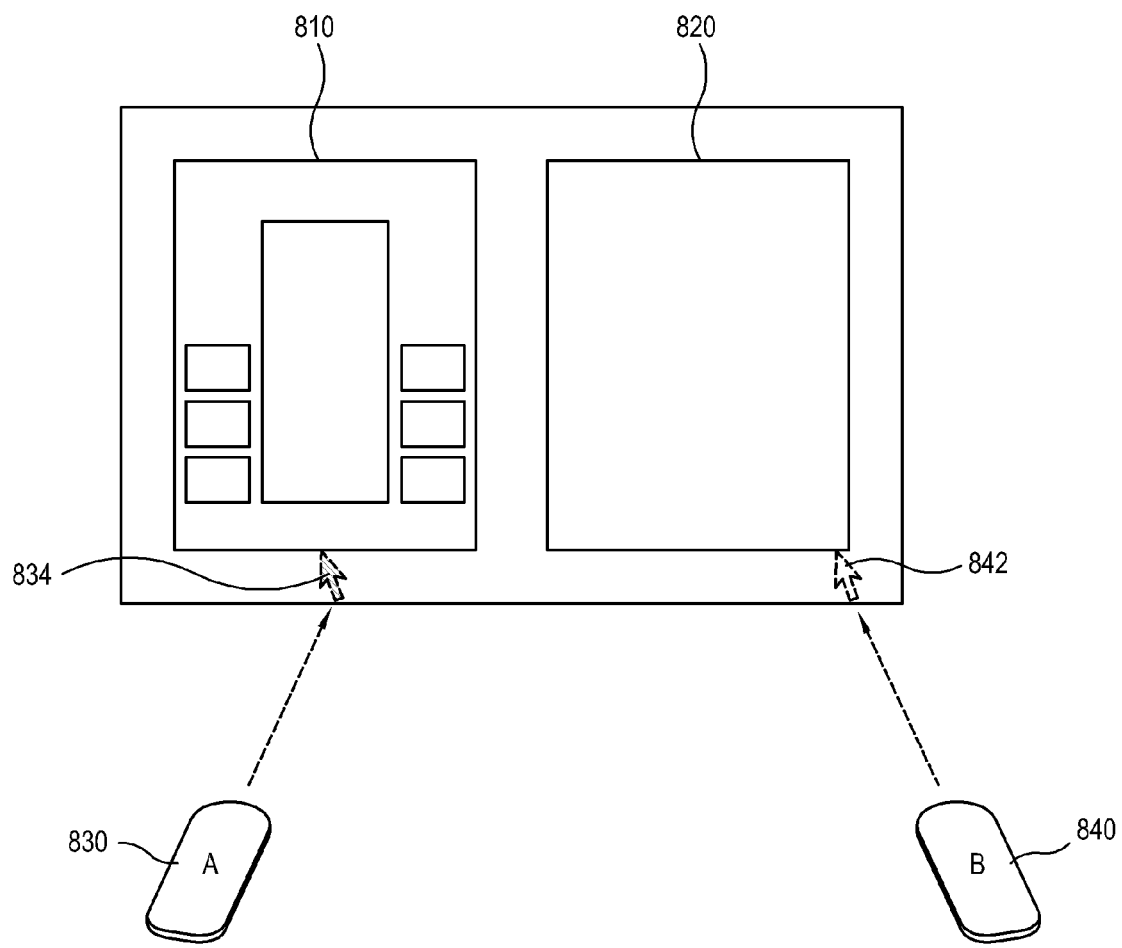
FIG. 8D shows a display in which the form of the pointing cursor is changed when transferred beyond a target to be controlled.

FIG. 8D shows that the form of the pointing cursor may be changed when moved beyond a target to be controlled.

If the pointing device A 830 is assigned to the game screen 810 and the pointing device B 840 is assigned to the broadcasting screen 820, the pointing cursor A 834 can move within the region of the game screen 810 to be controlled. Further, the pointing cursor B 842 can move within the region of the broadcasting screen 820 to be controlled. In this case, the outline of the pointing cursor A 834 and the pointing cursor B 842 may be changed in the form of a dotted line if pointing cursor A 834 and pointing cursor B 842 are moved beyond their respective movable region. Referring to FIG. 8D, the outline of the pointing cursor A 834, which has been moved beyond the region of the game screen 810, and the outline of the pointing cursor B 842, which has been moved beyond the region of the broadcasting screen 820, are displayed in the form of a dotted line.

Figure 9:
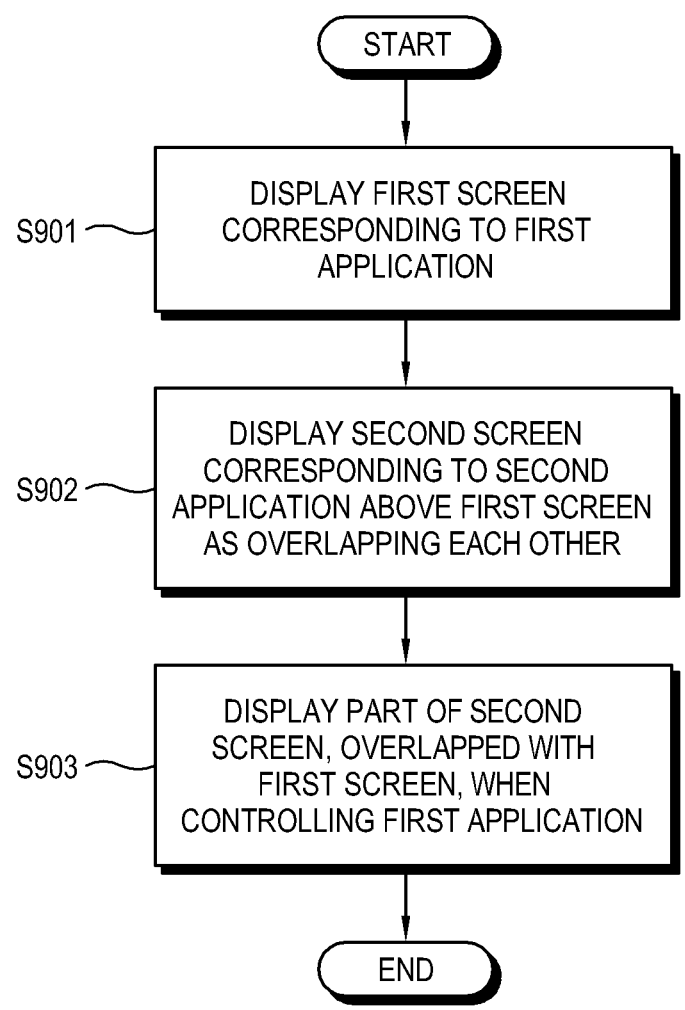
FIG. 9 is a control flowchart of an image processing apparatus according to a first exemplary embodiment.

FIG. 9 is a control flowchart of an image processing apparatus according to a first exemplary embodiment.

At operation S901, the image processing apparatus 100 displays a first screen corresponding to a first application.

At operation S902, the image processing apparatus 100 displays a second screen corresponding to a second application above the first screen, in which the second screen and the first screen overlap each other.

At operation S903, the image processing apparatus 100 displays a part of the second screen, overlapped with the first screen, while controlling the first application.

Figure 10:
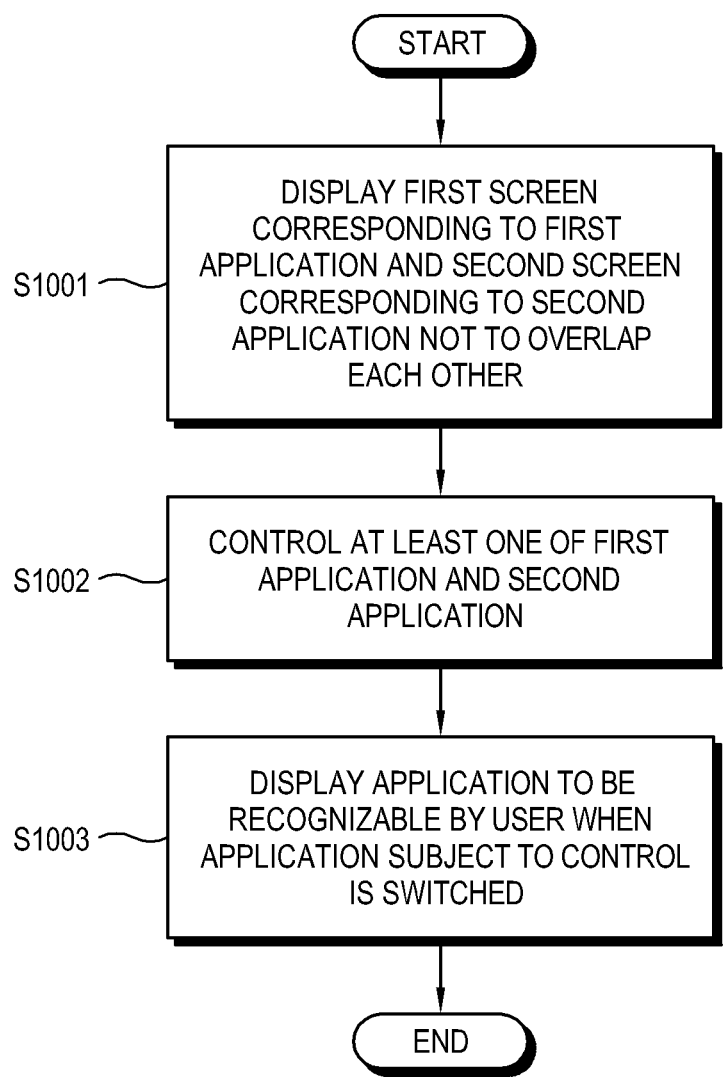
FIG. 10 is a control flowchart of an image processing apparatus according to a second exemplary embodiment.

FIG. 10 is a control flowchart of an image processing apparatus according to a second exemplary embodiment.

At operation S1001, the image processing apparatus 100 displays a first screen corresponding to a first application and a second screen corresponding to a second application so that the first screen and second screen do not overlap each other.

At operation S1002, the image processing apparatus 100 controls at least one of the first application and the second application.

At operation S1003, the image processing apparatus 100 displays the application to be recognized by a user when the application subject to the control is switched.

As described above, in the case that a plurality of applications are simultaneously running under environment of a DTV or a PC, the respective applications can be controlled at the same time through a single or plurality of input devices, and the cursors for simultaneously controlling the plurality of applications can be displayed.

Also, in the case that a plurality of contents are controlled through the plurality of input devices at the same time, there can be provided a user interface intuitively controllable by a user. Further, a system simultaneously controllable by several users can be achieved in one computer device having a display unit.

Although a few exemplary embodiments have been shown and described, it will be appreciated by those skilled in the art that changes may be made in these embodiments without departing from the principles and spirit of the invention, the scope of which is defined in the appended claims and their equivalents.

What is claimed is:

1. A method of controlling an image processing apparatus including a single display unit, the method comprising:

displaying a first screen corresponding to a first application and a second screen corresponding to a second application, such that the first screen and the second screen do not overlap on the single display unit;

controlling at least one of the first application and the second application; and if the controlled at least one of the first and the second applications is changed, displaying the first screen and the second screen to identify the controlled at least one of the first and the second applications, wherein at least one pointing cursor for controlling at least one of the first application and the second application is displayed on at least one of the first screen and the second screen, wherein the at least one pointing cursor comprises a first pointing cursor and a second pointing cursor, and wherein the first pointing cursor and the second pointing cursor control the first application and the second application, respectively.

2. The method according to claim 1, wherein the at least one pointing cursor controls at least one of the first application and the second application corresponding to one of the first screen and the second screen that are displayed underlying the at least one pointing cursor.

3. The method according to claim 1, wherein the at least one pointing cursor is movable to at least one location of above the first screen, below the first screen, above the second screen, and below the second screen.

4. The method according to claim 3, wherein the at least one pointing cursor is changed in at least one of transparency, shape, brightness and color if the at least one cursor is moved from a first location to a second location that is different from the first location.

5. The method according to claim 1, wherein the at least one pointing cursor respectively corresponds to at least one pointing device.

6. The method according to claim 1, wherein the first pointing cursor is movable within a region of the first screen corresponding to the first application, and the second pointing cursor is movable within a region of the second screen corresponding to the second application.

7. The method according to claim 6, wherein the first pointing cursor and the second pointing cursor are changed in at least one of transparency, shape, brightness and color when moved beyond the region of the first screen and the region of the second screen, respectively.

8. The method according to claim 1, wherein the first pointing cursor and the second pointing cursor correspond to a first pointing device and a second pointing device, respectively.

9. An image processing apparatus comprising:
a single display unit;
an image processor which processes and displays an image; and
a controller which controls the image processor to display a second screen corresponding to a second application above and overlapping at least a portion of a first screen corresponding to a first application on the single display unit, and to display at least a portion of the second screen that overlaps the first screen, when controlling the first application,
wherein the controller controls the image processor to display at least one pointing cursor for controlling at least one of the first application and the second application, on at least one of the first screen and the second screen,
wherein the at least one pointing cursor comprises a first pointing cursor and a second pointing cursor, and the first pointing cursor and the second pointing cursor control the first application and the second application, respectively, and
wherein if one of the first screen and the second screen is not displayed, the first pointing cursor or the second pointing cursor corresponding to the non-displayed one of the first screen and the second screen controls an application corresponding to a displayed one of the first screen and the second screen that underlies and is most adjacent to the first pointing cursor or the second pointing cursor corresponding to the non-displayed one of the first screen and the second screen.

10. The image processing apparatus according to claim 9, wherein the first pointing cursor and the second pointing cursor are changed in at least one of transparency, shape, brightness and color while the first pointing cursor or the second pointing cursor control the application corresponding to the displayed one of the first screen and the second screen that underlies and is most adjacent to the first pointing cursor or the second pointing cursor corresponding to the non-displayed one of the first screen and the second screen.

11. The image processing apparatus according to claim 9, wherein the first pointing cursor is movable within a region of the first screen corresponding to the first application, and the second pointing cursor is movable within a region of the second screen corresponding to the second application.

12. The image processing apparatus according to claim 11, wherein the first pointing cursor and the second pointing cursor are changed in at least one of transparency, shape, brightness and color when moved beyond the region of the first screen and the region of the second screen, respectively.

13. The image processing apparatus according to claim 9, wherein the first pointing cursor and the second pointing cursor correspond to a first pointing device and a second pointing device, respectively.

14. An image processing apparatus comprising:
a single display unit;
an image processor which processes and displays an image; and
a controller which controls the image processor to display a first screen corresponding to a first application and a second screen corresponding to a second application, such that the first screen and the second screen do not overlap on the single display unit, controls at least one of the first application and the second application, and controls the image processor, if the controlled at least one of the first application and the second application is changed, to display the first screen and the second screen to identify the controlled at least one of the first application and the second application,
wherein the controller controls the image processor to display at least one pointing cursor for controlling at least one of the first application and the second application on at least one of the first screen and the second screen,
wherein the at least one pointing cursor comprises a first pointing cursor and a second pointing cursor, and
wherein the first pointing cursor and the second pointing cursor control the first application and the second application, respectively.

15. The image processing apparatus according to claim 14, wherein the at least one pointing cursor controls at least one of the first application and the second application corresponding to one of the first screen and the second screen that are displayed underlying the at least one pointing cursor.

16. The image processing apparatus according to claim 14, wherein the at least one pointing cursor is movable to at least one location of above the first screen, below the first screen, above the second screen, and below the second screen.

17. The image processing apparatus according to claim 16, wherein the at least one pointing cursor is changed in at least one of transparency, shape, brightness and color if the at least one cursor is moved from a first location to a second location that is different from the first location.

18. The image processing apparatus according to claim 14, wherein the at least one pointing cursor respectively corresponds to at least one pointing device.

19. The image processing apparatus according to claim 14, wherein the first pointing cursor is movable within a region of the first screen corresponding to the first application, and the second pointing cursor is movable within a region of the second screen corresponding to the second application.

20. The image processing apparatus according to claim 19, wherein the first pointing cursor and the second pointing cursor are changed in at least one of transparency, shape, brightness and color when moved beyond the region of the first screen and the region of the second screen, respectively.

21. The image processing apparatus according to claim 14, wherein the first pointing cursor and the second pointing cursor correspond to a first pointing device and a second pointing device, respectively.

22. The image processing apparatus according to claim 9, wherein the application corresponding to one of the first screen and the second screen that underlies and is most adjacent to the first pointing cursor or the second pointing cursor corresponding to the non-displayed one of the first screen and the second screen is one of the first application and the second application.

23. A method of controlling an image processing apparatus including a single display unit, the method comprising:
displaying a first screen corresponding to a first application;
displaying a second screen corresponding to a second application above the first screen such that the second screen overlaps at least a portion of the first screen on the single display unit; and
displaying at least a portion of the second screen that overlaps the portion of the first screen, while controlling the first application,
wherein at least one pointing cursor for controlling at least one of the first application and the second application is displayed on at least one of the first screen and the second screen,
wherein the at least one pointing cursor comprises a first pointing cursor and a second pointing cursor, and the first pointing cursor and the second pointing cursor control the first application and the second application, respectively,
wherein if one of the first screen and the second screen is not displayed, the first pointing cursor or the second pointing cursor corresponding to the non-displayed one of the first screen and the second screen controls an application corresponding to a displayed one of the first screen and the second screen that underlies and is most adjacent to the first pointing cursor or the second pointing cursor corresponding to the non-displayed one of the first screen and the second screen, and
wherein the application corresponding to one of the first screen and the second screen that underlies and is most adjacent to the first pointing cursor or the second pointing cursor corresponding to the non-displayed one of the first screen and the second screen is one of the first application and the second application.

* * * * *